US012664594B1

(12) United States Patent
Miller et al.

(10) Patent No.: US 12,664,594 B1
(45) Date of Patent: Jun. 23, 2026

(54) SYSTEM AND METHOD FOR FACILITATING DIRECT SETTLEMENT NEGOTIATIONS BETWEEN INJURY CLAIMANTS AND INSURANCE COMPANIES

(71) Applicants: Wayne Allan Miller, Land O'Lakes, FL (US); Bruce Wayne Miller, Land O'Lakes, FL (US)

(72) Inventors: Wayne Allan Miller, Land O'Lakes, FL (US); Bruce Wayne Miller, Land O'Lakes, FL (US)

( * ) Notice: Subject to any disclaimer, the term of this patent is extended or adjusted under 35 U.S.C. 154(b) by 0 days.

(21) Appl. No.: 19/273,756

(22) Filed: Jul. 18, 2025

(51) Int. Cl.
  *G06Q 40/00* (2023.01)
  *G06Q 40/08* (2012.01)
  *G06T 7/50* (2017.01)

(52) U.S. Cl.
  CPC ......... *G06Q 40/09* (2025.08); *G06Q 40/0841* (2025.08); *G06T 7/50* (2017.01)

(58) Field of Classification Search
  CPC combination set(s) only.
  See application file for complete search history.

(56) References Cited

U.S. PATENT DOCUMENTS

2002/0091552 A1*  7/2002  Dombroski ............ G06Q 30/02
                                                                  705/4
2004/0054558 A1*  3/2004  Wahlbin ................. G06Q 10/10
                                                                  705/4
2005/0075912 A1*  4/2005  Bealke ................... G06Q 50/18
                                                                  705/311
2005/0080653 A1*  4/2005  Stemple ................. G06Q 30/02
                                                                  705/4
2007/0150377 A1*  6/2007  Burchetta .............. G06Q 50/18
                                                                  705/4

(Continued)

OTHER PUBLICATIONS

Motor Claims Processing: Digital Solutions Review and Assessment; 2020 6th IEEE Congress on Information Science and Technology (CiSt) (2021, pp. 42-47); Younes Elgargouh, Lamia Demraoui, Reda Chbihi, Hicham Behja, El Moukhtar Zemmouri; Jun. 5, 2021 . . . (Year: 2021).*

*Primary Examiner* — Tien C Nguyen
(74) *Attorney, Agent, or Firm* — Inventions International Inc.; Tiffany C. Miller

(57) ABSTRACT

A system and method are disclosed for facilitating direct settlement negotiations between injury claimants and insurance companies via a mobile application. The system verifies whether a claimant has legal representation, collects personal and incident information, and transmits the data to the appropriate insurance company. The system optionally uses an artificial intelligence (AI) module to analyze claimant data, sensor-derived injury evidence, and supporting documents to generate a settlement valuation score. Based on the score, the system triggers a settlement workflow, such as issuing a settlement offer within a predetermined range or initiating an investigation into prior injuries. Claimants may digitally execute liability release agreements upon accepting settlement offers. The system improves efficiency by reducing attorney involvement, accelerating settlement timelines, and lowering administrative burdens for insurers. Sensor integration enables enhanced injury validation, while AI-assisted valuation ensures dynamic and data-driven settlement handling.

9 Claims, 18 Drawing Sheets

100

(56)     References Cited

U.S. PATENT DOCUMENTS

| | | | |
|---|---|---|---|
| 2009/0187428 A1* | 7/2009 | Scalet | G06Q 10/10 |
| | | | 705/4 |
| 2011/0246244 A1* | 10/2011 | O'Rourke | G06Q 10/10 |
| | | | 705/4 |
| 2011/0320226 A1* | 12/2011 | Graziano | G06Q 40/08 |
| | | | 705/4 |
| 2014/0214470 A1* | 7/2014 | Wheeler | G06Q 10/1057 |
| | | | 705/322 |
| 2014/0236632 A1* | 8/2014 | Ambrose | G06Q 10/10 |
| | | | 705/3 |
| 2015/0058231 A1* | 2/2015 | Kinney | G06Q 10/10 |
| | | | 705/311 |
| 2015/0332407 A1* | 11/2015 | Wilson, II | G06V 10/751 |
| | | | 705/4 |
| 2021/0319519 A1* | 10/2021 | Tsao | G06F 40/186 |
| 2023/0110486 A1* | 4/2023 | Patt | G06Q 10/10 |
| | | | 705/4 |
| 2023/0113765 A1* | 4/2023 | Patt | G06F 16/24553 |
| | | | 705/4 |
| 2023/0260041 A1* | 8/2023 | Schaps | G06N 5/022 |
| | | | 705/4 |
| 2024/0303745 A1* | 9/2024 | Fields | G06N 3/006 |

* cited by examiner

700 system 1300

| | | | |
|---|---|---|---|
| mobile device 1310 | server 1320 | artificial intelligence module 1330 | workflow engine 1340 |

Figure 15A:
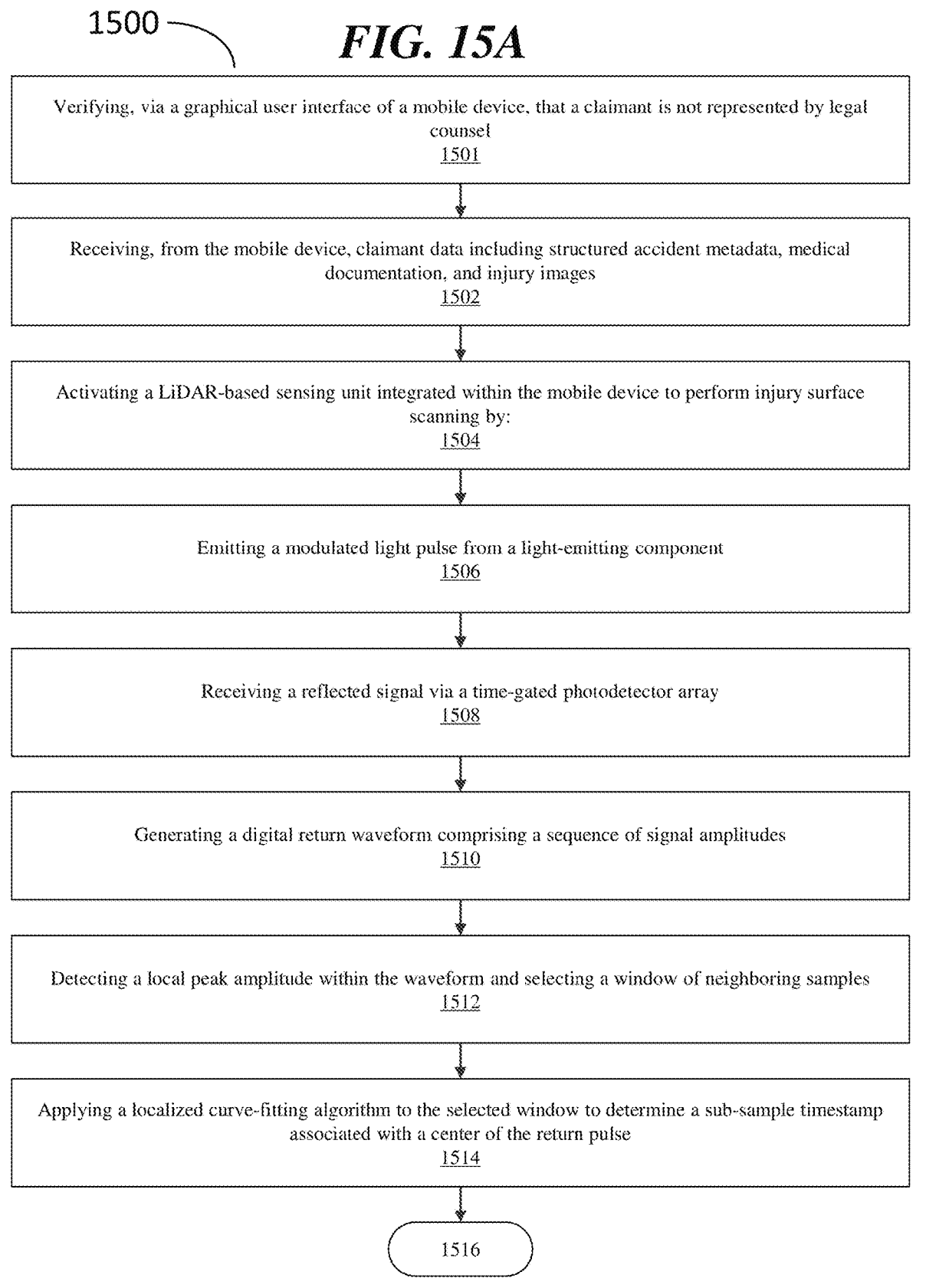

Verifying, via a graphical user interface of a mobile device, that a claimant is not represented by legal counsel
1501

↓

Receiving, from the mobile device, claimant data including structured accident metadata, medical documentation, and injury images
1502

↓

Activating a LiDAR-based sensing unit integrated within the mobile device to perform injury surface scanning by:
1504

↓

Emitting a modulated light pulse from a light-emitting component
1506

↓

Receiving a reflected signal via a time-gated photodetector array
1508

↓

Generating a digital return waveform comprising a sequence of signal amplitudes
1510

↓

Detecting a local peak amplitude within the waveform and selecting a window of neighboring samples
1512

↓

Applying a localized curve-fitting algorithm to the selected window to determine a sub-sample timestamp associated with a center of the return pulse
1514

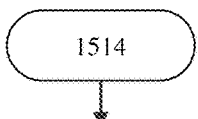

1514

Calculating a round-trip time of flight based on the sub-sample timestamp and a known speed of light
1516

Determining a distance to the scanned surface based on the time of flight and using that distance to generate a three-dimensional injury profile
1518

Transmitting the claimant data and the three-dimensional injury profile over an encrypted network connection to a remote insurance company server
1520

Processing the received data with an artificial intelligence module configured to apply trained machine learning models to generate a settlement valuation based on the injury profile, accident metadata, and historical case data
1522

Triggering a settlement workflow comprising either:
(a) generation and transmission of a digital settlement offer accompanied by a release agreement, or
(b) initiation of a prior injury verification procedure, based on threshold conditions applied to an AI-generated valuation.

1524

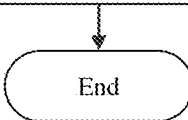

End

SYSTEM AND METHOD FOR FACILITATING DIRECT SETTLEMENT NEGOTIATIONS BETWEEN INJURY CLAIMANTS AND INSURANCE COMPANIES

FIELD OF THE EMBODIMENTS

The field of the invention and its embodiments relate to a system and method of facilitating direct settlement negotiations between injury claimants and insurance companies, specifically by enabling claimants to transmit claim-related information via a mobile application, optionally utilizing artificial intelligence to generate a settlement valuation, and triggering settlement workflows based on the valuation.

BACKGROUND

Conventionally, individuals involved in injury incidents such as car accidents, slip and falls, or workplace injuries often rely on legal representation to negotiate settlements with insurance companies. The involvement of attorneys increases the total cost of settlement processes, resulting in reduced net compensation to claimants. Additionally, insurance companies expend substantial resources defending against protracted claims. There is a need for a system that facilitates direct, efficient, and legally compliant communication between injury claimants and insurance companies to accelerate settlements while reducing costs for both parties.

Some injury claimants who suffer harm due to incidents such as car accidents, workplace accidents, and/or slip and fall events typically pursue compensation through insurance claims. Traditionally, the settlement process involves legal representation wherein attorneys negotiate with insurance companies on behalf of the claimant. Although legal representation can be beneficial in maximizing recovery, it introduces several problems into the settlement process. Typically, attorney fees often consume a substantial portion of the settlement amount, typically ranging from 30% to 40%, which reduces the net compensation available to the claimant. Second, the involvement of attorneys often leads to prolonged settlement processes, increasing administrative burdens and costs for insurance companies. Third, once attorneys become involved, insurance companies are often required to allocate additional resources toward defense strategies, medical investigations, and litigation preparations, further escalating costs.

Moreover, current settlement practices lack efficient, direct channels for claimants to initiate and conclude negotiations independently. Even when a claimant might be willing to settle quickly for a reasonable amount, there is no standardized platform that allows claimants to transmit information securely to insurers and receive expedited settlement offers without legal intermediary involvement. Attempts to simplify the claims process have not adequately addressed the need for a direct negotiation tool that minimizes legal complexities while providing sufficient safeguards for both claimants and insurers.

SUMMARY OF THE EMBODIMENTS

In accordance with the principles of the present invention, there exists a need for a system and method that enable injury claimants to directly and securely communicate with insurance companies, provide necessary evidence to substantiate claims, optionally generate preliminary settlement valuations through artificial intelligence, and facilitate streamlined, legally compliant settlement agreements without the necessity for attorney intervention. Existing mobile applications primarily focus on claims reporting or document submission, but do not provide structured settlement facilitation workflows or integrated decision-support mechanisms, such as artificial intelligence-based valuation systems. The disclosed system and method enable injury claimants to directly initiate and negotiate settlements with insurance companies via a mobile application. The application collects claimant information, injury details, and supporting documentation, transmits the information to insurers, and optionally employs an artificial intelligence (AI) system to estimate a monetary settlement value. The AI-generated value assists insurers in determining whether to offer an expedited settlement or initiate further investigation.

The technical solution provided by the disclosed system and method addresses the inefficiencies in conventional injury claim settlement processes by introducing specific technological improvements. Rather than merely facilitating the transmission of claim information, the system implements a multi-stage, rules-based settlement facilitation engine that integrates (1) claimant legal status verification workflows, (2) structured evidence collection and formatting from mobile device inputs including depth and heat mapping sensors, (3) artificial intelligence-based dynamic settlement valuation modules, and (4) conditional workflow triggers based on settlement valuation thresholds to determine further actions such as issuing settlement offers or initiating prior injury investigations. These features are not merely generic implementations of a business process but are rooted in specific technological improvements to mobile communication, data analysis, and decision automation. By using sensor-enhanced injury evidence collection and AI-driven valuation scoring that dynamically adjusts workflows, the system materially alters how claim settlements are initiated and processed. This provides a concrete technological solution that improves the functioning of computer and communication systems.

In some aspects, the techniques described herein relate to a system for facilitating direct settlement negotiations between injury claimants and insurance companies, including: an electronic device including: a user interface configured to receive claimant inputs, accident data, and supporting documentation; and a LiDAR-based injury mapping assembly configured to generate a three-dimensional spatial representation of one or more physical injuries, the injury mapping assembly including: a mechanical support structure configured to retain an array of light-emitting components and corresponding photodetector elements arranged in spatial alignment; a rotational actuation mechanism operatively coupled to the support structure and configured to rotate the array of light-emitting components and photodetector elements about a rotational axis at a speed ranging from about 100 revolutions per minute (RPM) to about 350 RPM; the light-emitting components configured to emit pulsed light signals during rotation to illuminate a target region of a body of a claimant, and the photodetector elements configured to receive reflected light signals and generate corresponding depth data; a motion correction and scan verification subsystem configured to detect motion-related anomalies, correct spatial distortion in real time, and initiate reacquisition of data if scan completeness or integrity falls below a predefined threshold; a server communicatively coupled to the electronic device and configured to receive the claimant inputs and the spatial injury representation; an artificial intelligence module operatively associated with the server and configured to generate a settlement valuation based at least in part on the claimant inputs and the spatial injury representation; and a workflow engine configured to trigger a settlement offer generation or initiate a prior injury investigation based on the settlement valuation.

In some aspects, the techniques described herein relate to a non-transitory computer-readable medium storing instructions that, when executed by one or more processors in a mobile computing system with a LiDAR-based injury documentation subsystem and an artificial intelligence module, cause the computing system to perform operations including: verifying, via a graphical user interface of a mobile device, that a claimant is not represented by legal counsel; receiving, from the mobile device, claimant data including structured accident metadata, medical documentation, and injury images; activating a LiDAR-based sensing unit integrated within the mobile device to perform injury surface scanning by: emitting a modulated light pulse from a light-emitting component; receiving a reflected signal via a time-gated photodetector array; generating a digital return waveform including a sequence of signal amplitudes; detecting a local peak amplitude within the waveform and selecting a window of neighboring samples; applying a localized curve-fitting algorithm to the selected window to determine a sub-sample timestamp associated with a center of the return pulse; calculating a round-trip time of flight based on the sub-sample timestamp and a known speed of light; and determining a distance to the scanned surface based on the time of flight and using that distance to generate a three-dimensional injury profile; transmitting the claimant data and the three-dimensional injury profile over an encrypted network connection to a remote insurance company server; processing the received data with an artificial intelligence module configured to apply trained machine learning models to generate a settlement valuation based on the injury profile, accident metadata, and historical case data; and triggering a settlement workflow including either: (a) generation and transmission of a digital settlement offer accompanied by a release agreement, or (b) initiation of a prior injury verification procedure, based on threshold conditions applied to an AI-generated valuation.

In some aspects, the techniques described herein relate to a computer-implemented method for facilitating direct settlement negotiations between a claimant and an insurance company, including: receiving, via a mobile application, claimant information and accident data; verifying non-representation by legal counsel; transmitting the claimant information and accident data to an insurance company server; generating, via an artificial intelligence module, a settlement valuation based on the received data; triggering, based on the settlement valuation, one or more settlement workflows including issuing a settlement offer or initiating prior injury investigation.

In some aspects, the techniques described herein relate to a method, further including prompting the claimant to upload accident reports, medical documentation, and photographic evidence, wherein said photographic evidence is analyzed using depth or heat mapping sensors to extract injury data.

In some aspects, the techniques described herein relate to a method, wherein the settlement valuation is transmitted exclusively to the insurance company without displaying to the claimant.

In some aspects, the techniques described herein relate to a method, wherein a predetermined valuation threshold triggers automatic generation of a settlement offer within a range of about $500 to about $4,000.

In some aspects, the techniques described herein relate to a method in which, upon determining that a settlement valuation exceeds a predetermined threshold, an internal investigation is automatically triggered by the insurance company to evaluate the claimant's prior injury history.

In some aspects, the techniques described herein relate to a method, further including presenting the claimant with an option to execute a digital liability release agreement via the mobile application upon acceptance of a settlement offer.

In some aspects, the techniques described herein relate to a method, wherein the insurance company server identifies claimant policy details based on an uploaded accident report and pre-existing customer databases.

In some aspects, the techniques described herein relate to a method, wherein injury severity extracted from sensor data is used to modify the settlement valuation.

In some aspects, the techniques described herein relate to a method, further including presenting selectable options to the claimant to identify a liable insurance company from a database.

In some aspects, the techniques described herein relate to a method, wherein the settlement valuation includes factors selected from the group consisting of: accident severity, medical treatment received, injury photographs, and historical accident data.

In some aspects, the techniques described herein relate to a computer-implemented method for facilitating direct settlement negotiations between a claimant and an insurance company, including: executing, on a claimant computing device including at least one processor, memory, and a display, a mobile application configured to receive input from the claimant; receiving, via the mobile application, claimant information and accident data; verifying, via the mobile application, that the claimant is not represented by legal counsel; transmitting the claimant information and accident data from the claimant computing device to an insurance company server via a secure network connection; generating, via an artificial intelligence module executed by the insurance company server, a settlement valuation based on the received claimant information and accident data; triggering, based on the settlement valuation, one or more settlement workflows including issuing a settlement offer or initiating a prior injury investigation; receiving, via a thermography sensor operatively coupled to the claimant computing device, thermographic image data indicative of temperature variations in a region of a body of a clamant; processing, via an onboard image analysis module, the thermographic image data to identify hot and cold zones indicative of inflammation or injury severity; integrating, via the artificial intelligence module, the processed thermographic injury data into a settlement valuation calculation; generating, via the claimant computing device, a chatbot interface including a natural language input section and a chatbot response section, the chatbot interface configured to simulate human conversation with the claimant; generating, via the chatbot interface, a structured result table based on claimant data, accident attributes, injury severity, and settlement workflow status; displaying, via the chatbot response section on the claimant computing device display, the result table in response to a natural language query entered in the chatbot input section; and executing, via the mobile application, a digital signature interface that enables the claimant to accept a settlement offer and execute a liability release agreement electronically.

In some aspects, the techniques described herein relate to a method, wherein the thermography sensor is configured to capture both still images and real-time video.

In some aspects, the techniques described herein relate to a method, wherein the image analysis module classifies inflammation zones using a predefined color temperature scale and maps them to anatomical regions.

In some aspects, the techniques described herein relate to a method, wherein the chatbot interface provides contextual follow-up prompts based on the claimant's prior queries and displayed result table content.

In some aspects, the techniques described herein relate to a method, wherein the result table includes selectable entries that reveal expanded content including uploaded medical documentation and accident photos.

In some aspects, the techniques described herein relate to a method, wherein the secure network connection employs end-to-end encryption compliant with HIPAA or equivalent data privacy standards.

In some aspects, the techniques described herein relate to a method, further including storing the result table and thermographic data in a secure, access-controlled database associated with a claimant record.

In some aspects, the techniques described herein relate to a method, wherein the artificial intelligence module uses machine learning trained on prior injury cases to adjust the settlement valuation based on thermographic injury data patterns.

In some aspects, the techniques described herein relate to a method, wherein processing the thermographic image data includes: converting, via the image analysis module, pixel intensity values of the thermographic image to corresponding temperature values using calibration data; segmenting the thermographic image into predefined anatomical regions using computer vision algorithms; computing a temperature gradient matrix across the segmented anatomical regions; and classifying at least one anatomical region as inflamed based on a comparison of the computed temperature values or gradients to a threshold or a machine learning model trained on historical injury data.

In some aspects, the techniques described herein relate to a system for facilitating direct settlement negotiations between a claimant and an insurance company, the system including: a claimant computing device including at least one processor, a memory, a display, and a thermography sensor; a mobile application stored in the memory and executable by the processor of the claimant computing device, the mobile application configured to: receive claimant information and accident data; verify, based on received input, that the claimant is not represented by legal counsel; transmit the claimant information and accident data to an insurance company server over a secure network connection; provide a chatbot interface, the chatbot interface including a natural language input section and a chatbot response section; generate a structured result table including at least claimant data, accident attributes, injury severity, and settlement workflow status; display the structured result table via the chatbot response section in response to a natural language query entered via the natural language input section; receive thermographic image data captured by the thermography sensor; and provide a digital signature interface configured to allow the claimant to electronically execute a liability release agreement upon acceptance of a settlement offer; an image analysis module stored in the memory and executable by the processor of the claimant computing device, the image analysis module configured to: convert pixel intensity values of the thermographic image data into corresponding temperature values using calibration data; segment the thermographic image data into predefined anatomical regions using computer vision algorithms; compute a temperature gradient matrix across the segmented anatomical regions; and classify at least one anatomical region as inflamed based on a comparison of the temperature values or gradients to at least one of a threshold value or a machine learning model trained on historical injury data; and an artificial intelligence module hosted on the insurance company server, the artificial intelligence module configured to: generate a settlement valuation based on the claimant information, the accident data, and the classified thermographic injury data; and trigger, based on the settlement valuation, one or more settlement workflows including issuance of a settlement offer or initiation of a prior injury investigation.

In some aspects, the techniques described herein relate to a system, wherein the thermography sensor is configured to capture both still-frame thermal images and real-time thermal video data.

In some aspects, the techniques described herein relate to a system, wherein the image analysis module applies an edge-detection algorithm or trained convolutional neural network to perform segmentation of anatomical regions in the thermographic image data.

In some aspects, the techniques described herein relate to a system, wherein the chatbot interface is further configured to prompt the claimant to upload accident scene photographs, medical records, or other supporting documents, and display metadata extracted from one or more uploaded files in the result table.

In some aspects, the techniques described herein relate to a system, wherein the structured result table includes selectable visual elements that, when selected, display expanded information corresponding to thermal injury analysis or claim status.

In some aspects, the techniques described herein relate to a system, wherein the secure network connection between the claimant computing device and the insurance company server is configured to use end-to-end encryption compliant with HIPAA or other applicable data protection standards.

In some aspects, the techniques described herein relate to a system, wherein the artificial intelligence module is further configured to retrain the machine learning model used by the image analysis module based on verified outcomes containing thermographic injury data.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

FIG. 13 is a block diagram illustrating a system, according to some embodiments.

FIG. 15A is a flowchart illustrating a method, according to some embodiments of the present disclosure.

FIG. 15B is a flowchart extending from FIG. 15A and further illustrating the method, according to some embodiments of the present disclosure.

DETAILED DESCRIPTION

FIGS. 1-17 illustrate systems and methods for facilitating direct settlement negotiations between injury claimants and insurance companies using a mobile application. The system includes modules for claimant verification, evidence collection through sensor data capture, and secure data transmission to insurer servers. An artificial intelligence engine processes sensor data and uploaded documents to generate settlement valuations. Based on the valuation, the system triggers either automated settlement offer generation or prior injury investigation workflows. Mobile device architecture supports data capture and transmission, while server-side components manage AI processing, workflow execution, and database interactions. The system includes functionality for digital execution of liability releases and interfaces for uploading accident reports, medical records, and selecting insurance companies. An AI training module refines valuation predictions based on historical claim outcomes. The overall architecture integrates mobile sensing, AI-driven valuation, secure communication, and automated settlement workflows.

Upon launching the application, users are prompted to declare whether they are represented by an attorney. If represented, the application discontinues further processing to avoid legal conflicts. If not represented, users proceed to input personal data, accident details, and upload supporting documentation such as accident reports and medical records. The application transmits this information to the appropriate insurer, identified via a selectable database. In some embodiments, one or more AI modules analyze user-provided data and any sensor-derived injury evidence (e.g., photographs using phone depth sensors or heat mapping) to generate a preliminary monetary value range for the claim. This value is only visible to the insurer and can trigger different settlement pathways depending on threshold criteria.

In some embodiments, if the AI-determined monetary value is below a predefined threshold, the insurer may issue a rapid settlement offer. If above the threshold, the insurer may initiate further investigations into prior injuries or adjust settlement calculations accordingly. In both cases, settlement agreements, including liability waivers, may be executed digitally through the application, concluding the claims process without requiring attorney involvement.

Figure 1:
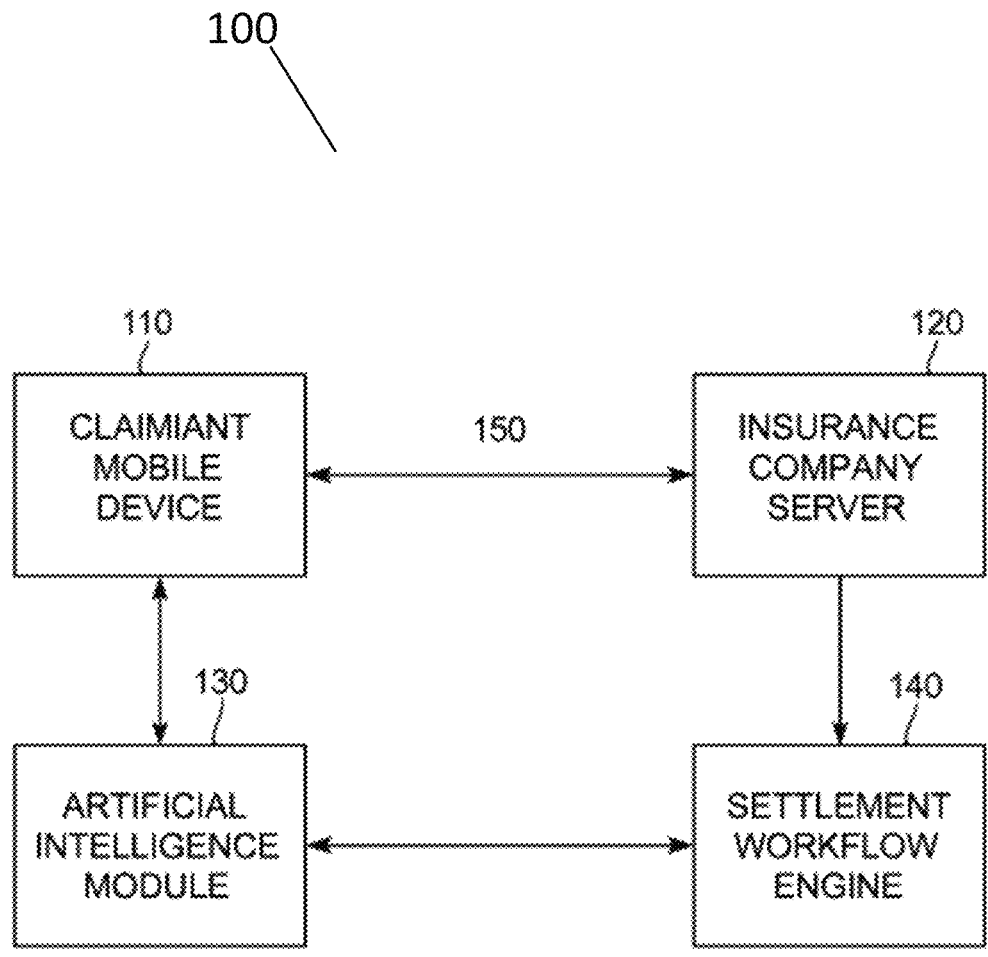
FIG. 1 is a block diagram illustrating an overview of the system architecture for facilitating direct settlement negotiations between injury claimants and insurance companies via a mobile application, according to some embodiments.

FIG. 1 illustrates an overview block diagram of a system 100 for facilitating direct settlement negotiations between injury claimants and insurance companies. The system 100 includes a claimant mobile device 110, an insurance company server 120, an artificial intelligence module 130, and a settlement workflow engine 140, all communicatively coupled via a network 150.

In some embodiments, system 100, which is engineered to streamline and automate the settlement negotiation process between injury claimants and insurance providers. At the forefront is the claimant mobile device 110, which serves as the primary interface for users to input personal information, incident details, and upload pertinent documentation such as accident reports and medical records. This device may also leverage built-in sensors to capture real-time data, enhancing the accuracy of the claim. The information collected is transmitted over a secure network 150 to the insurance company server 120. This server acts as the central hub, receiving and processing incoming data, and interfacing with internal databases to manage claim records effectively.

Integrated within the server infrastructure is the artificial intelligence module 130. This module employs advanced machine learning algorithms to analyze the submitted claim data, evaluating factors such as injury severity, consistency of information, and potential indicators of fraud. For example, it can assess uploaded images to estimate damage extent or cross-reference medical records for validation purposes. Based on the AI's analysis, the settlement workflow engine 140 orchestrates the subsequent steps in the claims process. This engine determines appropriate actions, such as approving claims, requesting additional information, or escalating cases for manual review, ensuring that each claim progresses through predefined stages while maintaining compliance with regulatory standards and company policies.

The network 150 serves as the communication backbone, facilitating real-time data exchange between the claimant's mobile device, the insurance company server, the AI module, and the settlement workflow engine. It ensures secure and efficient transmission of sensitive information across all system components. Collectively, these interconnected elements work in unison to enhance the efficiency, accuracy, and speed of the settlement negotiation process, reducing manual intervention and expediting resolution times for injury claims.

In some embodiments, the artificial intelligence (AI) module within system 100 performs specific, practical technological functions that extend beyond mere data analysis. The AI module 130 is integral to the system's operation, executing a series of concrete steps that transform raw claim data into actionable insights, thereby facilitating efficient and accurate settlement negotiations.

The AI module 130 operates by ingesting diverse data inputs from the claimant mobile device 110, including structured information such as personal details and incident specifics, as well as unstructured data including, but not limited to, one or more photographs and/or medical records. It preprocesses this data by normalizing formats, extracting relevant features, and organizing the information for subsequent analysis. The module employs advanced machine learning algorithms to analyze the preprocessed data, utilizing computer vision techniques to assess photographs of injuries or damages, natural language processing to interpret medical reports, and predictive analytics to evaluate the consistency and credibility of the claim. Based on this comprehensive analysis, the AI module calculates a settlement valuation score that reflects the estimated compensation amount, considering factors such as injury severity, treatment costs, and comparable case outcomes. This valuation process incorporates jurisdiction-specific legal standards and historical settlement data to ensure accuracy and fairness. The generated valuation score is then transmitted to the settlement workflow engine 140, which determines the next steps in the claims process, such as approving claims, requesting additional information, or escalating cases for manual review.

AI module's operations constitute a practical application of AI technology, yielding a tangible improvement in the field of insurance claim processing. The AI module 130 does not merely perform abstract data analysis; it executes a series of specific, technical steps that transform raw, unstructured data into a structured settlement valuation, directly influencing the claim resolution process. This transformation addresses real-world challenges in the insurance industry, such as reducing claim processing times, minimizing human error, and enhancing fraud detection. By automating complex analysis tasks that traditionally required human expertise and time, the AI module provides a concrete technological solution.

Furthermore, the integration of the AI module with other system components, such as the claimant mobile device 110 and the settlement workflow engine 140, demonstrates a cohesive system architecture that collectively contributes to the improved functionality and efficiency of the claims settlement process. In summary, the AI module 130 embodies a specific technological advancement that applies AI to address existing inefficiencies in insurance claim processing.

The AI module 130 within system 100 is implemented as a specialized, integrated component designed to perform a series of concrete, technologically grounded operations that transform raw claim data into actionable settlement decisions. This implementation addresses practical challenges in insurance claim processing and aligns with the requirements of 35 U.S.C. § 101 by demonstrating a specific, inventive application of artificial intelligence.

Figure 2:
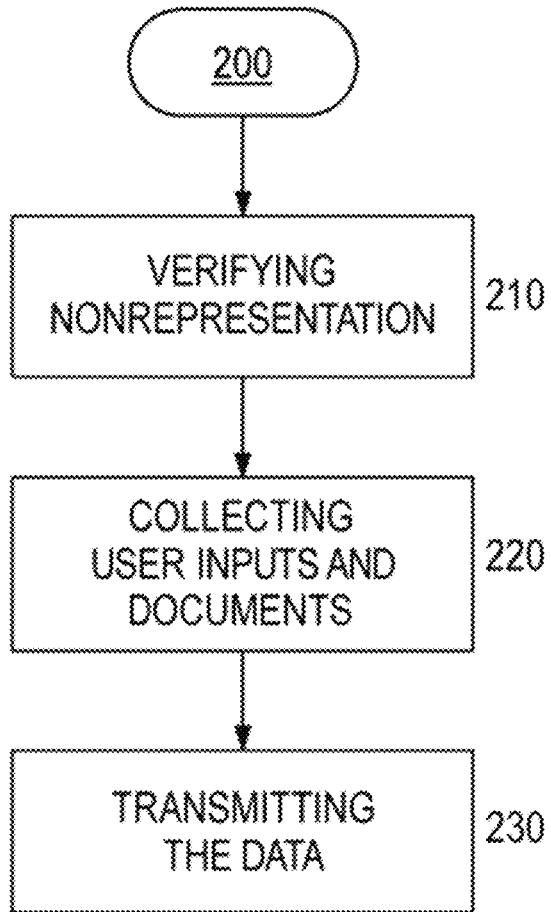
FIG. 2 is a flowchart illustrating an example method for claimant verification, evidence collection, and data transmission to an insurance company, according to some embodiments.

FIG. 2 illustrates a flowchart of a method 200 for verifying claimant legal status, collecting accident data, and transmitting the collected information to an insurance company server. The method 200 includes steps of verifying non-representation 210, collecting user inputs and documents 220, and transmitting the data 230. The method 200 is provided for facilitating the initial stages of an injury claim by first prompting the claimant to confirm, via the mobile application interface, that they are not represented by legal counsel at block 210. Once non-representation is verified, the system guides the claimant through entering essential accident details, such as date, time, location, and a descriptive narrative, and uploading supporting materials, including photographs of the scene, medical records, and police reports at block 220. After gathering this comprehensive information, the system employs secure encryption protocols to transmit the collected data to the insurance company server 120 for further processing at block 230. By automating these steps, verification of legal status, structured data and document collection, and secure data transmission, method 200 streamlines the claims intake process, reduces manual effort, and ensures that insurers receive accurate and complete information for timely claim assessment.

Figure 3:
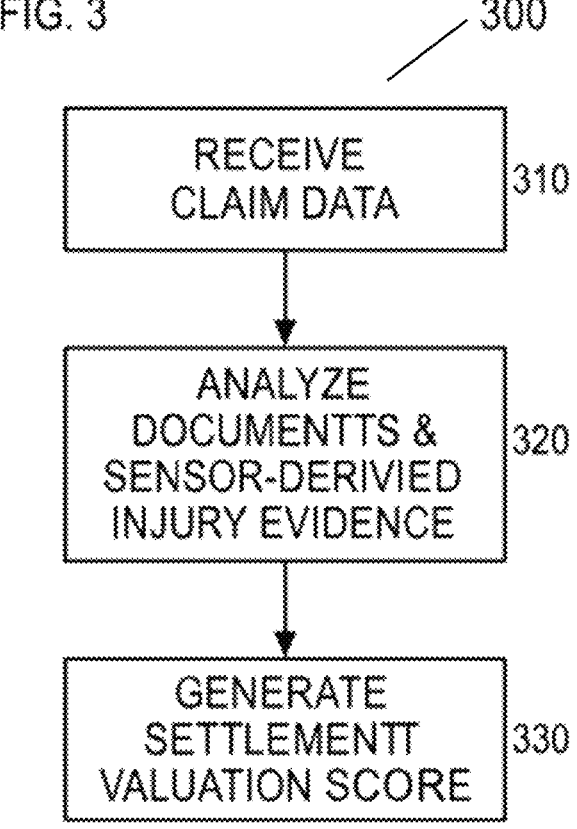
FIG. 3 is a flowchart illustrating the settlement valuation process using an artificial intelligence module, including sensor data analysis from mobile devices, according to some embodiments.

FIG. 3 illustrates a flowchart of a settlement valuation method 300 performed by an artificial intelligence module. The AI module receives claim data 310, analyzes uploaded documents and sensor-derived injury evidence 320, and generates a settlement valuation score 330. The method 300 begins with the AI module receiving claim data 310, which may include structured or unstructured information provided by a claimant, an insurance adjuster, or a healthcare provider. Examples of claim data include accident reports, claimant demographic data, injury descriptions, vehicle damage assessments, police narratives, and prior settlement history for similar cases. Claim data may be entered manually through an electronic form or extracted automatically from uploaded documents using natural language processing (NLP) algorithms.

Following receipt of the initial claim data, the method proceeds to an analyzing step 320, where the AI module processes both uploaded documents and sensor-derived injury evidence. Uploaded documents may include medical records, emergency room reports, imaging studies (e.g., X-rays, MRIs), and rehabilitation progress notes. Sensor-derived injury evidence may be collected from wearable devices or in-vehicle sensors that capture biometric readings (e.g., accelerometer data showing impact forces, wearable heart rate monitors showing trauma response). The AI module may utilize machine learning models, such as convolutional neural networks (CNNs) for analyzing medical images and transformer-based models for processing unstructured text within medical narratives or police reports.

In some embodiments, the AI module applies injury severity scoring algorithms that map the detected injuries to standardized severity scales, such as the Abbreviated Injury Scale (AIS) or Injury Severity Score (ISS). Additional factors may be incorporated, including claimant age, comorbid conditions, liability percentages, and historical recovery trajectories based on similar claim types.

Based on the synthesized evidence and extracted features, the method advances to generating a settlement valuation score 330. The settlement valuation score represents a predicted monetary range or recommendation for claim settlement and may be output as a single value or a probabilistic distribution. The valuation score may consider jurisdictional differences, historical award data, and insurer-specific guidelines. In one example, the AI module may determine that based on the injury pattern (e.g., cervical strain, mild concussion) and local precedents, the recommended settlement range is between $15,000 and $25,000 with a confidence level of 85%. The AI module may also generate supporting outputs such as an annotated injury report, a confidence heatmap indicating factors most heavily influencing the valuation, and optional recommendations for follow-up assessments that could impact the claim.

In some embodiments, the AI module may also continually learn by incorporating feedback data, such as actual settlement outcomes or litigation results, into its model parameters through supervised learning or reinforcement learning techniques. The settlement valuation method 300 enables faster, more consistent, and data-driven claim assessments, reducing the need for extensive manual review while promoting transparency and fairness in injury-related settlements.

Figure 4:
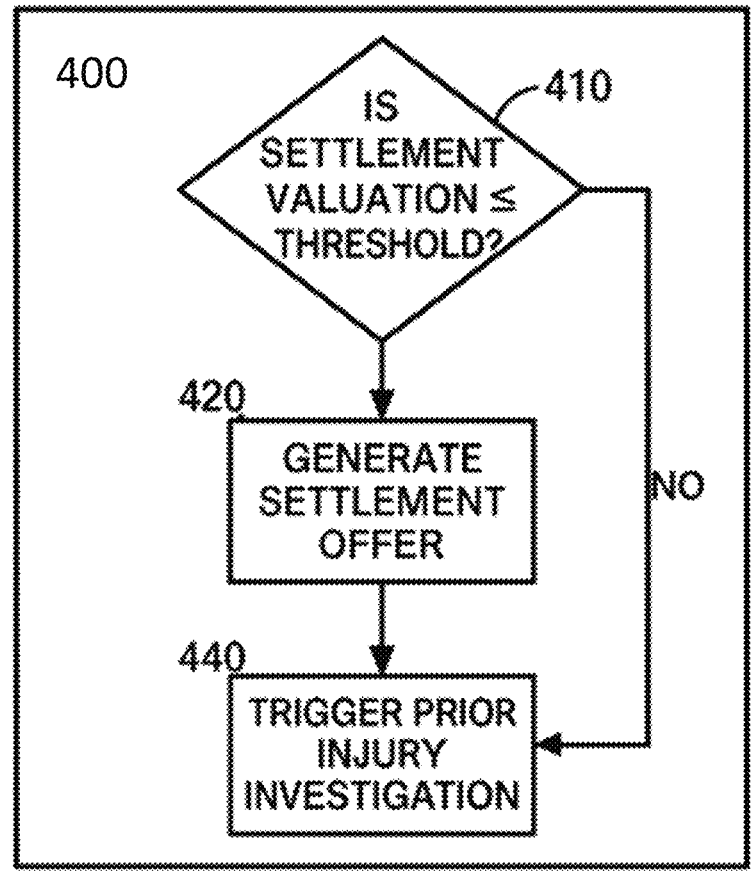
FIG. 4 is a flowchart illustrating workflow branching based on the AI-generated settlement valuation, including triggering settlement offer generation or prior injury investigation, according to some embodiments.

FIG. 4 illustrates a flowchart of a workflow branching method 400 based on the settlement valuation. If the valuation is below a threshold 410, a settlement offer is generated 420. If the valuation exceeds a threshold 430, a prior injury investigation is triggered 440. The workflow-branching method 400 is provided for automated post-valuation processing within the settlement platform. The method begins at decision node 410, where a processor compares the AI-generated settlement valuation score (see FIG. 3, block 330) against a predefined monetary threshold stored in system memory. If the valuation is less than or equal to the threshold, control follows the "YES" path to rectangular process block 420. At block 420 the workflow engine invokes an offer-generation routine that (i) formats a draft release agreement, (ii) merges the claimant's policy limits and loss data, and (iii) transmits the proposed settlement offer to the claimant mobile device for electronic signature. Should the valuation exceed the threshold, control follows the "NO" path to block 440, where the system launches a prior-injury investigation. Block 440 retrieves historical claim files linked to the claimant's identifier, queries third-party medical-billing repositories, and performs anomaly detection on longitudinal treatment data to confirm or adjust the preliminary valuation. Upon completion of either block 420 or block 440, the workflow returns status metadata to the central settlement workflow engine for further action such as supervisory review, offer renegotiation, or claim escalation.

Figure 5:
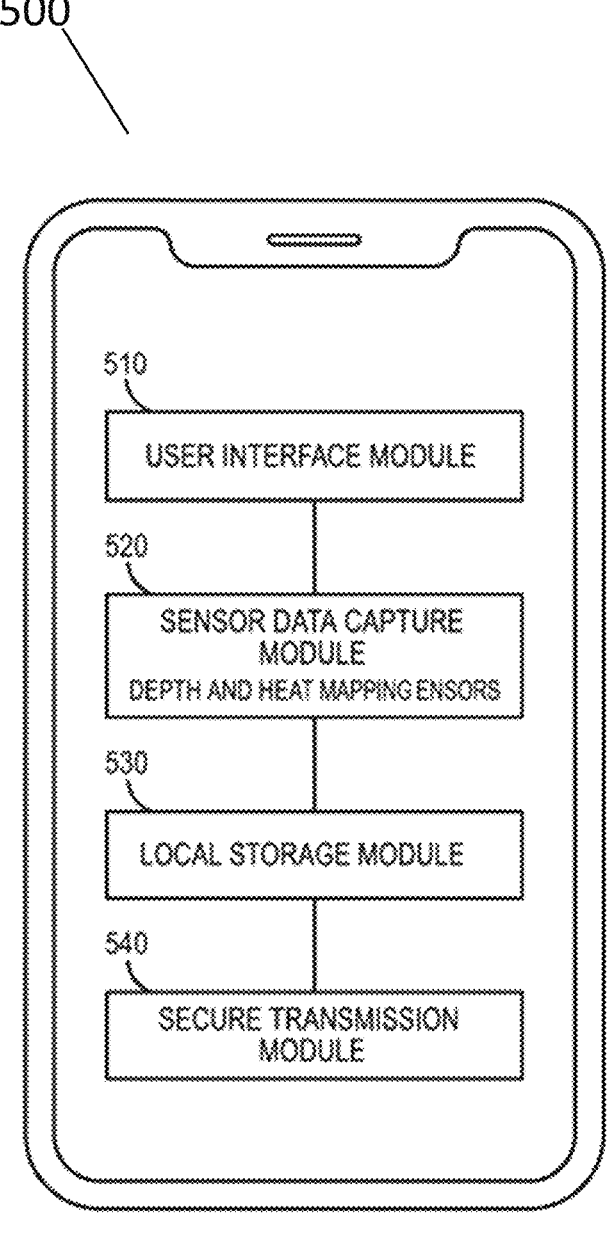
FIG. 5 is a block diagram illustrating an example mobile device architecture for receiving claimant inputs, capturing sensor data, and transmitting the information securely to an insurer server, according to some embodiments.

FIG. 5 illustrates a mobile device architecture 500 including a user interface module 510, a sensor data capture module 520 comprising depth and heat mapping sensors, a local storage module 530, and a secure transmission module 540 configured to transmit data to the insurance server. The mobile device architecture 500 comprises several integrated modules that cooperate to capture, process, store, and securely transmit data relevant to insurance-related assessments. The user interface module 510 is configured to facilitate user interactions by displaying prompts, instructions, and feedback during data capture operations; for example, the interface may guide a user to position the mobile device at specific angles when scanning an injury site. The sensor data capture module 520 includes depth sensors, such as LiDAR sensors, and heat mapping sensors, such as infrared thermographic cameras, which work together to obtain multi-dimensional spatial and thermal data from a subject or object. In operation, the depth sensor may generate a three-dimensional point cloud of a bodily injury, while the heat mapping sensor simultaneously records temperature variations across the surface, identifying areas of inflammation. The local storage module 530 is configured to temporarily store captured sensor data and associated metadata, such as timestamps, GPS coordinates, and user identifiers, prior to processing or transmission. In some embodiments, the local storage may utilize encryption protocols such as AES-256 to protect sensitive data while stored on the device. The secure transmission module 540 is configured to transmit the locally stored data to an insurance server over encrypted channels, such as HTTPS with TLS 1.3 encryption, thereby ensuring confidentiality and integrity during data transfer. Additional security measures, such as public key infrastructure (PKI) authentication, may be employed to verify the identity of the receiving server before any data is transmitted. Together, these modules enable a streamlined, secure, and accurate collection and communication of injury or accident-related information, supporting expedited insurance claim evaluations and risk assessments.

Referring to FIG. 5, a mobile device architecture 500 for personal injury claims is disclosed, comprising a user interface module 510, a sensor data capture module 520, a local storage module 530, and a secure transmission module 540. This architecture enables an injured user (claimant) to capture detailed evidence of personal injuries using a mobile device and ensures that the data is securely stored and transmitted to an insurance server for claim processing. The modules work in concert to guide the user through documenting injuries (via the user interface), to collect advanced sensor data (depth and thermal information) about the injuries, to protect the sensitive data on the device, and to transmit it safely to a remote server. A detailed description of each component of the architecture 500 and its operation in the context of personal injury documentation is provided below.

The user interface module 510 is configured to present an interactive, guided injury documentation experience on the mobile device. It provides a touchscreen-based interface that walks the user through capturing and inputting all relevant information about an injury. For example, the user interface module 510 may display step-by-step prompts to ensure comprehensive documentation: it can instruct the user to photograph visible injuries (such as bruises, cuts, or lacerations) with the device's camera, and to record short video clips demonstrating any mobility limitations (for instance, a limited range of motion when trying to bend an injured knee or wrist). The module 510 supports direct touchscreen input, allowing the user to annotate images or enter textual descriptions of symptoms and circumstances. For instance, the user can draw on a photo to highlight the area of swelling or type notes describing pain levels and functional limitations. This guided interface ensures that the claimant systematically records all pertinent evidence of injuries in a standardized format, improving the completeness and consistency of personal injury claim documentation.

The sensor data capture module 520 comprises advanced sensing hardware that records detailed physical characteristics of the injury beyond conventional 2D images. In particular, the module 520 includes one or more depth sensors (for example, a Light Detection and Ranging (LiDAR) sensor, a structured light depth camera, or a stereoscopic camera pair) configured to capture three-dimensional information about the injury site. These depth sensors operate by emitting or projecting signals (such as laser pulses or structured infrared light patterns) and measuring their return or distortion to construct a depth map of the subject area. By using depth sensing, the mobile device can accurately gauge the topography and dimensions of an injury, for example, generating a 3D model of a swollen ankle or the contours of a bruised region of tissue. This allows quantification of attributes like swelling volume or bruise surface area, providing objective metrics to support the injury assessment. For instance, a LiDAR sensor scan of a laceration or bruise can determine its precise surface area and depth; indeed, wound size measurement using smartphone LiDAR has been demonstrated as a simple and reliable method for assessing wounds with high accuracy. Similarly, a stereoscopic camera system can capture two or more images from slightly different angles and reconstruct a three-dimensional representation of an injured limb, which helps document any deformity or abnormal posture resulting from the injury. Through these depth-sensing capabilities, the sensor data capture module 520 captures physical injury details (such as the degree of swelling or the shape and size of a bruise) that augment the visual evidence with measurable data.

The sensor data capture module 520 further includes one or more heat mapping sensors to record thermal information about the injury. In an embodiment, a thermal infrared imaging sensor (infrared camera) is integrated into or attached to the mobile device to detect temperature variations across the skin surface of the injured area. In personal injury contexts, these thermal sensors capture heat maps of injuries to reveal physiological signs of trauma or inflammation that may not be evident from visual inspection alone. For example, a thermal imager can scan a sprained ankle or a bruised region and detect localized areas of elevated temperature corresponding to inflammation. Increased blood flow and metabolic activity in injured tissue often cause the skin in that area to emit more heat; the thermal data thus provides an objective indicator of injury severity by highlighting such "hot spots." In some embodiments, infrared thermography can serve as an objective tool for identifying and documenting inflammatory changes due to trauma. A heat mapping sensor in module 520 may produce a color-coded thermal image of the injury (for instance, warmer colors indicating higher temperatures on the skin where swelling or tissue damage is present). By documenting the heat signature of a bruise or swollen joint, the system can confirm the presence of inflammation or deep tissue injury in support of the personal injury claim. This thermal evidence complements the visual photographs and depth measurements, providing a more comprehensive picture of the injury (e.g., showing that a region is not only visibly swollen, but also warmer than surrounding areas, consistent with acute inflammation).

The local storage module 530 is responsible for securely storing all collected injury data on the mobile device. This module may utilize the device's internal memory or an attached storage medium to save the photos, videos, depth maps, thermal images, and user inputs that comprise the injury documentation. Because the stored data contains sensitive personal information (including medical details and claim-related evidence), the local storage module 530 employs robust encryption and access control to protect data at rest. In one embodiment, all injury data saved by module 530 is encrypted using a strong encryption algorithm such as Advanced Encryption Standard (AES) with a 256-bit key. AES-256 encryption is widely recognized as a highly secure standard for safeguarding sensitive information, and its use helps ensure that the claimant's photos and sensor readings remain confidential. The encryption can be applied on-the-fly as data is written to local storage, so that the files cannot be accessed in readable form outside the authorized application. Even if the mobile device is lost, stolen, or compromised, the encrypted injury data would remain unintelligible without the proper decryption keys or credentials. In addition to encryption, the local storage module 530 may integrate with secure hardware elements of the device (for example, leveraging a trusted execution environment or secure enclave available on the device's chipset) to store encryption keys or perform cryptographic operations, further enhancing security. Access to the stored data can be restricted such that only the claim application (and the authenticated user of that application) can decrypt or view the content. In this way, the local storage module 530 maintains the integrity and privacy of the personal injury documentation on the device until it is ready to be transmitted.

The secure transmission module 540 is configured to transmit the collected injury data from the mobile device to an external insurance server in a safe and authenticated manner. When the user is ready to submit their personal injury claim evidence, this module 540 handles the upload of data over a network (such as cellular data or Wi-Fi) with end-to-end security. The secure transmission module establishes an encrypted communication channel using Transport Layer Security (TLS), preferably the latest TLS 1.3 protocol, to protect the data in transit. By using TLS 1.3, the module ensures that all photos, videos, 3D depth data, and thermal readings are encrypted during transfer with state-of-the-art cryptographic techniques, preventing eavesdropping or tampering by unauthorized parties. In some implementations, the module 540 further employs end-to-end encryption of the payload itself in addition to the TLS channel. For example, the injury data files can be encrypted on the device with the insurance server's public key before transmission, such that only the insurance server (holding the corresponding private key) can decrypt and access the content after upload. This double layer of encryption (data-level encryption on top of the TLS tunnel) ensures maximum confidentiality, as even the cloud infrastructure or intermediate servers cannot decipher the sensitive information. Moreover, the secure transmission module 540 can enforce user authentication and optional multi-factor authentication (MFA) as part of the data upload process. In practice, this means the user must be logged into the claim application and may be required to perform an additional verification step before or during the upload, such as entering a one-time passcode sent to their phone, or providing a biometric confirmation (e.g., fingerprint or facial recognition) via the device's sensors. Requiring MFA for transmitting the claim data adds an extra layer of security and aligns with industry best practices for protecting sensitive data transfers. It helps ensure that the person initiating the upload is indeed the authorized claimant and that an attacker cannot surreptitiously send the data to an unintended recipient. Through these measures, the secure transmission module 540 guarantees that the personal injury evidence is delivered to the insurance server with confidentiality and integrity preserved, and that the data arrives authenticated as coming from a verified source.

In some embodiments, the mobile device architecture 500 of FIG. 5 integrates user-guided data collection, sophisticated sensor recording, and strong security protocols to facilitate personal injury claims. The user interface module 510 guides the claimant to gather comprehensive evidence (including photos, videos, and annotations of bruises, swelling, lacerations, and mobility limitations), while the sensor data capture module 520 provides additional depth and thermal information that objectively documents the physical condition of injuries. The local storage module 530 then secures this collected evidence on the device using encryption (e.g., AES-256) to maintain privacy, and the secure transmission module 540 ensures that all data can be uploaded to the insurance server safely using encrypted channels (e.g., TLS 1.3) and appropriate authentication. Together, these modules create a robust system for personal injury documentation, enabling more accurate and secure collection of injury data and its efficient transfer to insurance systems for claim evaluation.

Figure 6:
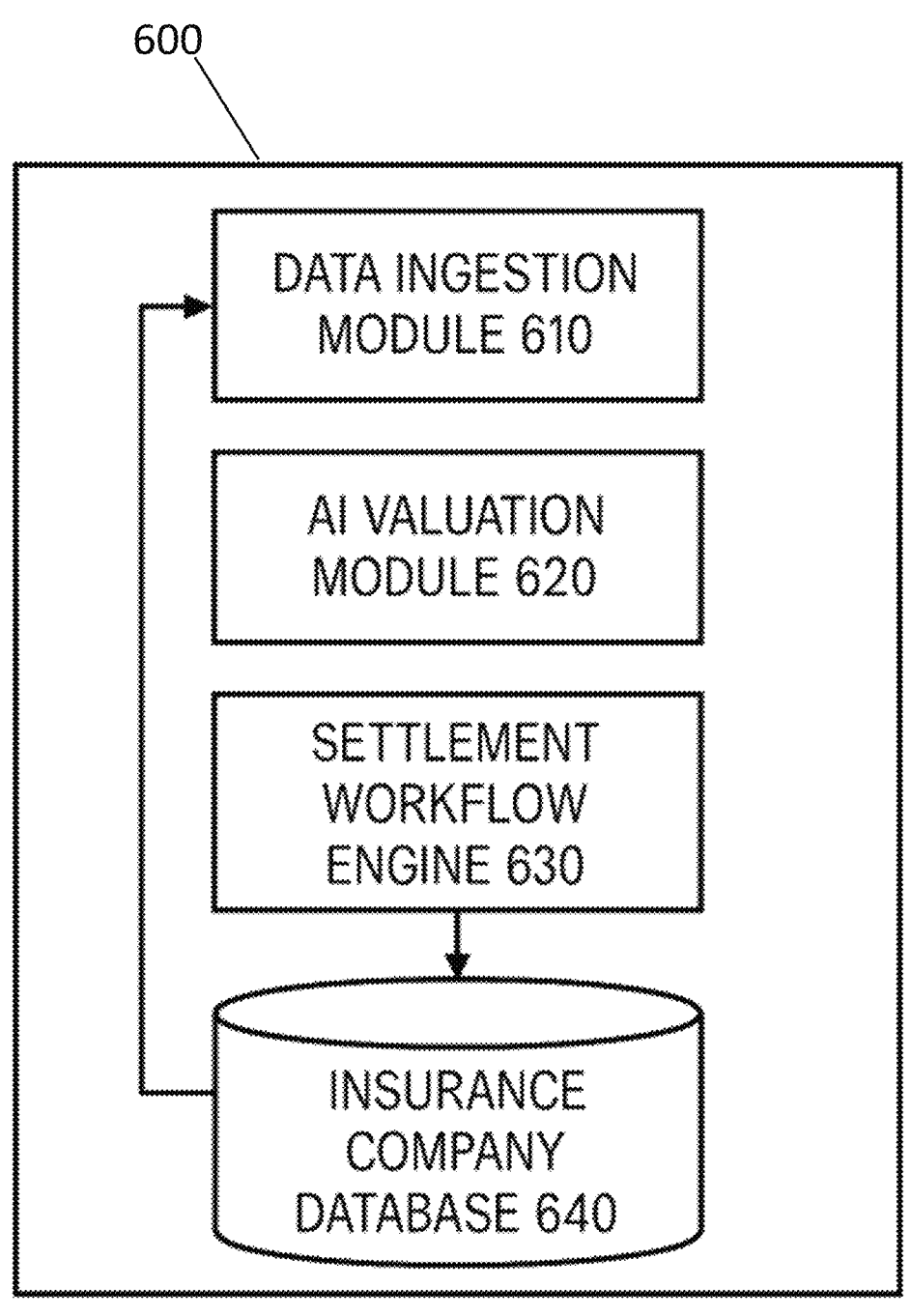
FIG. 6 is a block diagram illustrating a server-side architecture, including AI modules, settlement workflow engines, and insurance company databases, according to some embodiments.

FIG. 6 illustrates a server architecture 600 including a data ingestion module 610, an AI valuation module 620, a settlement workflow engine 630, and an insurance company database 640. The server architecture 600 is provided to streamline insurance operations through advanced data processing and automation. This architecture comprises four integral components: the Data Ingestion Module 610, the AI Valuation Module 620, the Settlement Workflow Engine 630, and the Insurance Company Database 640.

The Data Ingestion Module 610 serves as the entry point for diverse data sources, including mobile applications, web portals, and third-party systems. It utilizes robust Extract, Transform, Load (ETL) processes to handle structured data, such as claim forms and policy documents, as well as unstructured data like images and videos. For instance, when a policyholder submits a claim via a mobile app, the module captures the accompanying photographs and metadata, standardizes the formats, and ensures data quality before forwarding it for further analysis. This module may also employ real-time data streaming technologies to facilitate prompt processing of incoming information.

Once data is ingested, the AI Valuation Module 620 employs machine learning algorithms to assess claims efficiently. It analyzes various factors, such as the severity of damages depicted in images, historical claim data, and policy details, to estimate the claim's value accurately. For example, in the case of an automobile accident, the module can evaluate the extent of vehicle damage from submitted photos and cross-reference repair costs from past similar incidents to determine a fair compensation amount. This automated valuation accelerates the claims process and reduces the potential for human error.

The Settlement Workflow Engine 630 orchestrates the end-to-end claims settlement process. It integrates with internal systems and external services to manage tasks such as claim validation, fraud detection, approval routing, and payment processing. For instance, upon receiving the AI-generated valuation, the engine can automatically verify policy coverage, flag anomalies for manual review, and, if all checks pass, initiate payment disbursement. This engine ensures compliance with regulatory requirements and maintains audit trails for transparency.

The Insurance Company Database 640 acts as a centralized repository for all processed data. It stores comprehensive records of claims, customer interactions, policy information, and transaction histories. This database supports advanced analytics and reporting, enabling insurers to identify trends, monitor performance metrics, and make data-driven decisions. For example, analysis of claim frequencies and types can inform risk assessment models and guide the development of new insurance products. Collectively, this server architecture 600 enhances operational efficiency, improves customer satisfaction by expediting claim settlements, and provides insurers with valuable insights to refine their services and offerings.

In some embodiments, the AI Valuation Module 620 leverages advanced machine learning algorithms to analyze claim data and estimate settlement values. The module may utilize ensemble tree-based models like gradient boosting decision trees (for example, an XGBoost regressor) or Random Forests to perform this analysis. These algorithms are well-suited for handling structured tabular data and can capture non-linear interactions among features. In other embodiments, deep learning techniques are employed—for instance, a deep neural network model can be trained on a large dataset of past personal injury claims to predict likely settlement amounts from the input features. The system can also combine multiple models (an ensemble approach) to improve accuracy.

For example, the AI Valuation Module 620 might incorporate both a Random Forest and a neural network in parallel, blending their outputs to produce a final valuation. The machine learning models are trained on historical claim records that include details of injuries, costs, and final settlement or verdict amounts. Over time, the module "learns" the complex correlations between claim characteristics and financial outcomes. It may periodically retrain or update its models with new data so that the valuation predictions remain aligned with current trends (for instance, reflecting recent increases in medical costs or changes in typical jury awards). By using these algorithms, the AI Valuation Module 620 can rapidly evaluate new claims with a level of consistency and data-driven insight that surpasses traditional manual methods.

In some embodiments, the AI Valuation Module 620 is designed to assist in various aspects of personal injury claim evaluation. One primary use case is predicting settlement amounts for claims. For example, given the details of a particular personal injury case (such as an automobile accident claim), the module can process the relevant inputs and output an estimated settlement value. If the case involves a 45-year-old claimant who sustained a serious whiplash injury and a minor bone fracture in a car accident, requiring several months of treatment and accruing say $20,000 in medical bills, the module might analyze these facts and predict a likely settlement of a certain amount (for instance, around $50,000). This prediction is data-driven, derived from patterns learned from similar past cases. In addition to providing a point estimate, the system can suggest a negotiation range for the settlement. In the above scenario, the AI Valuation Module 620 may indicate that a reasonable negotiation range could be between approximately $40,000 and $60,000. This range reflects a confidence interval or the typical lower and upper bounds observed for comparable cases in the historical data. By presenting such a range, the module guides insurance adjusters or attorneys in formulating initial offers and setting expectations for an acceptable settlement bracket.

Another use case is risk scoring for litigation propensity. The AI Valuation Module 620 can evaluate the likelihood that a given claim will escalate to a lawsuit or require litigation. For instance, the module may employ a classification model (such as a logistic regression or a tree-based classifier) that outputs a probability or risk score indicating how likely the claim is to result in a lawsuit or trial. Consider a claim where the injured party has very high medical expenses and has retained an aggressive attorney early in the process, the module might recognize factors in this claim that historically correlate with disputes and assign a high litigation risk score. This serves as an alert to the insurer or claims handler that the case has a strong chance of going to court if not settled promptly. On the other hand, if another claim involves minor injuries and clear liability with no attorney involved, the module could assign a low litigation risk score, suggesting the claim will likely settle amicably without extensive legal intervention. By quantifying litigation risk, the AI Valuation Module 620 enables proactive measures: a high-risk case might prompt an adjuster to expedite a fair settlement offer to avoid a lawsuit, whereas a low-risk case might be handled in the routine course. This kind of risk scoring helps in allocating resources and can reduce overall litigation costs by focusing attention where it is most needed.

A further use case involves adjusting valuations based on jurisdiction-specific rules and norms. Personal injury claim values can vary widely depending on the geographical location or jurisdiction in which the claim arises, due to differing laws (for example, damages caps or no-fault statutes) and varying local jury tendencies. The AI Valuation Module 620 accounts for these differences to refine its output. In practice, the module incorporates the accident location or jurisdiction as a key factor in its analysis. For example, if a certain jurisdiction has a statutory cap on non-economic damages (such as a maximum limit for pain and suffering awards), the module will adjust its valuation accordingly so as not to exceed that cap in its predictions. As a concrete illustration, consider a severe injury case that, based purely on injury severity and economic loss, might be valued around $500,000 in general. If this case is in a state that imposes a $250,000 cap on non-economic damages, the AI Valuation Module 620 would recognize that limitation (either through learned experience from training data or via an integrated rules engine) and adjust the predicted settlement downward to comply with the cap, perhaps predicting, a $300,000 settlement instead of $500,000, given that a portion of the damages cannot legally exceed $250,000. In another example, the module might know that juries in a certain county are historically more generous to plaintiffs in serious injury cases; therefore, for a claim arising in that county, the module could subtly increase the suggested valuation to reflect the higher expected award. By tailoring the valuation to the jurisdiction, the system ensures the predictions are realistic and customized to the legal context of the claim. This feature is especially useful for insurers or legal professionals who deal with claims across multiple regions, as it automatically adapts the valuation model to local rules and settlement climates.

Through these use cases, from estimating settlement amounts and negotiation ranges to scoring litigation risk and adjusting for jurisdictional nuances, the AI Valuation Module 620 provides a comprehensive decision-support tool for personal injury insurance claims. It not only predicts the financial outcome of a claim with data-driven precision but also contextualizes the prediction with practical guidance (such as ranges and risk levels), helping claims adjusters, attorneys, or risk managers handle claims more efficiently and confidently.

Example Input Features for Settlement Prediction

To perform these analyses, the AI Valuation Module 620 relies on a broad array of input features that describe the claimant, the injury, and the claim circumstances. These input features capture both the economic and non-economic aspects of a personal injury case, allowing the machine learning algorithms to consider all factors that would influence a settlement. For example, the age of the patient or claimant is an important feature-a claimant's age can affect recovery outlook and earning capacity, which in turn can influence damages (a younger individual with a permanent injury might face decades of lost earnings, whereas an older retiree might not have wage loss, but could have other considerations such as pain and suffering). The type of injury and its severity are also critical inputs. The module can be provided with specific details about the injury, such as whether it involves a fracture, a soft-tissue injury like a sprain or whiplash, a spinal cord injury, a traumatic brain injury, or any other diagnostic information. Severity might be quantified through medical records or doctor's evaluations (for instance, a simple hairline fracture versus a compound fracture requiring surgery, or a mild concussion versus a severe traumatic brain injury).

Generally, more severe injuries, those causing long-term impairment or intense pain, lead to higher settlement valuations, and the model learns to weight those facts accordingly. The duration of medical treatment is another feature fed into the system. A claim where the patient required only a week of physical therapy differs greatly from one involving many months of rehabilitation or multiple surgeries; a longer treatment duration usually signals a more serious injury and greater damages. Thus, if the claimant underwent extended hospital stays or therapy over a year-long period, the module will take that into account. Similarly, rehabilitation time (which could overlap with treatment duration) and the overall recovery time are considered: prolonged rehabilitation or a slow recovery suggests impact on the person's life, which often raises the value of the claim due to extended pain, suffering, and inconvenience.

The financial losses and costs associated with the injury form another category of input features for the AI Valuation Module 620. The total medical costs incurred by the claimant is a prime example, this includes hospital bills, surgery costs, medication, physical therapy expenses, and any other treatment-related expenditures. This figure directly influences the economic damages portion of a claim and often serves as a baseline for settlement calculations (many settlements in personal injury cases are some multiple of the medical expenses). For instance, $50,000 in medical bills will typically lead to a higher settlement than $5,000 in medical bills, all else being equal, and the module uses this information when predicting the settlement value. Lost wages are another key input: the model considers how much income the claimant lost due to inability to work during recovery, as well as any expected future lost earnings if the injury has long-term vocational impacts. A person who missed six months of work or can no longer perform their previous job will have substantial wage loss, which should be reflected in a higher settlement estimate. The AI Valuation Module 620 can incorporate that by taking in the claimant's pre-injury salary and the length of work absence or reduction in earning capacity. In addition to these economic factors, the module may also factor in whether the claimant's daily life activities were affected (sometimes quantified as "loss of enjoyment of life" or other non-economic damage indicators), though such factors might be indirectly captured by the severity and treatment duration features.

The context and history of the claim provide further input features that enhance the model's predictions. The geographical location of the incident or claim jurisdiction, as discussed, is provided as an input so that the model knows the legal and economic environment surrounding the case. Prior settlement data from analogous cases can also be an input in a couple of ways. During the training of the machine learning model, the algorithm is exposed to many past cases with their outcomes, which is effectively using prior settlement data to learn. Additionally, the system could retrieve a few closely matching past cases (based on similar injury and circumstances) as explicit references, though even if not done explicitly, the influence of prior cases is implicit in the trained model. The claimant's litigation history might be another feature considered: for example, if the claimant has a record of filing multiple injury claims in the past, that could influence how an insurer values the credibility or risk of the current claim. Likewise, the module can ingest information about whether the claim is already in litigation (i.e., if a lawsuit has been filed) or if the claimant has legal representation. The involvement of an attorney, as noted in the risk scoring use case, often changes the dynamics of settlement (usually increasing the eventual payout and the time to resolution). Therefore, the fact of attorney represen- tation or a history of previous lawsuits could be included as model inputs.

For instance, a claim with an attorney involved might prompt the model to predict a higher settlement than a similar claim without an attorney, reflecting the reality that represented claims tend to settle for more. All these features, from injury details and costs to jurisdiction and claimant history, are processed together by the AI Valuation Module 620's algorithms. By considering a comprehensive set of features, the module is able to output a well-rounded valu- ation. It effectively mirrors the multifaceted analysis that a seasoned claims adjuster or legal expert would perform, but in an automated and consistently data-driven manner. Each feature contributes a piece of the puzzle: when the module sees, for example, a middle-aged claimant with a broken leg, $30,000 in medical bills, three months of missed work, and the accident in a plaintiff-friendly venue, it synthesizes all those inputs to arrive at a settlement prediction that accounts for medical costs, pain and suffering, lost income, and the local legal climate. This comprehensive feature-driven approach allows the AI Valuation Module 620 to provide accurate and context-aware financial valuations for personal injury insurance claims, supporting more informed decision- making in claim settlements.

Figure 7:
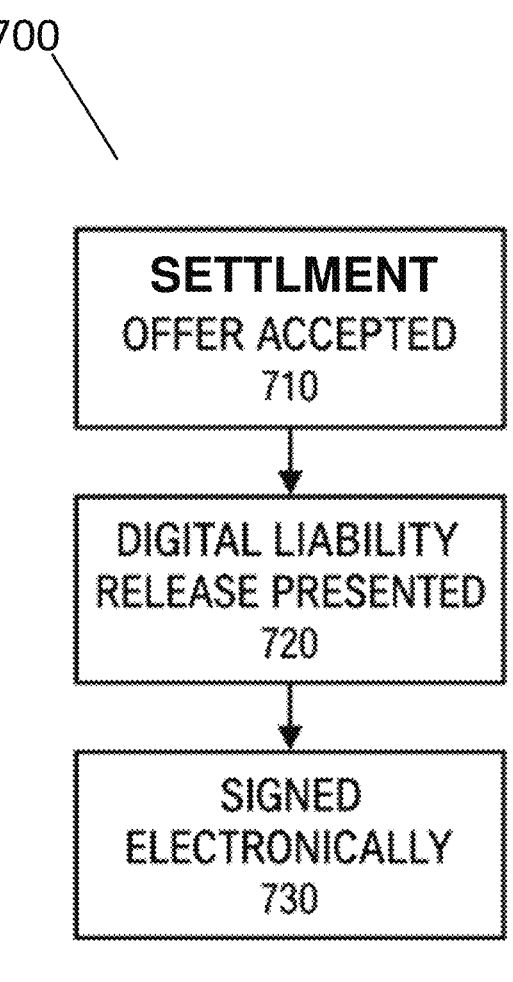
FIG. 7 is a flowchart illustrating the claimant's digital execution of a liability release agreement following acceptance of a settlement offer, according to some embodiments.

FIG. 7 illustrates a flowchart 700 of the claimant's digital execution of a settlement agreement. Upon acceptance of a settlement offer 710, a digital liability release agreement is presented 720 and signed electronically 730 through the mobile application. FIG. 7 presents a flowchart 700 detailing the claimant's digital execution of a settlement agreement via a mobile application. The process initiates when the claimant accepts a settlement offer 710, triggering the sys- tem to generate a digital liability release agreement 720. This agreement is then presented to the claimant within the mobile application for review. Upon thorough examination, the claimant proceeds to sign the agreement electronically 730 using integrated e-signature functionalities provided by the application.

The digital liability release agreement is typically a PDF document that includes all pertinent details of the settlement, such as the settlement amount, terms, and conditions. The mobile application facilitates the document's integrity and authenticity by employing secure methods like hash algo- rithms and encryption. For instance, platforms facilitate the creation and management of such digital documents, ensur- ing compliance with legal standards and providing a seam- less user experience.

The electronic signing process involves the claimant using the mobile application's interface to apply their sig- nature, which is then attached to the document. This method not only expedites the settlement process but also enhances security and reduces the reliance on physical paperwork.

The completed and signed agreement is stored securely within the system, accessible to both the claimant and the insurance company for future reference. By digitizing the settlement agreement process, insurance companies can streamline operations, reduce administrative overhead, and provide claimants with a more efficient and user-friendly experience. This approach aligns with the industry's move towards digital transformation, leveraging technology to improve service delivery and customer satisfaction.

Figure 8:
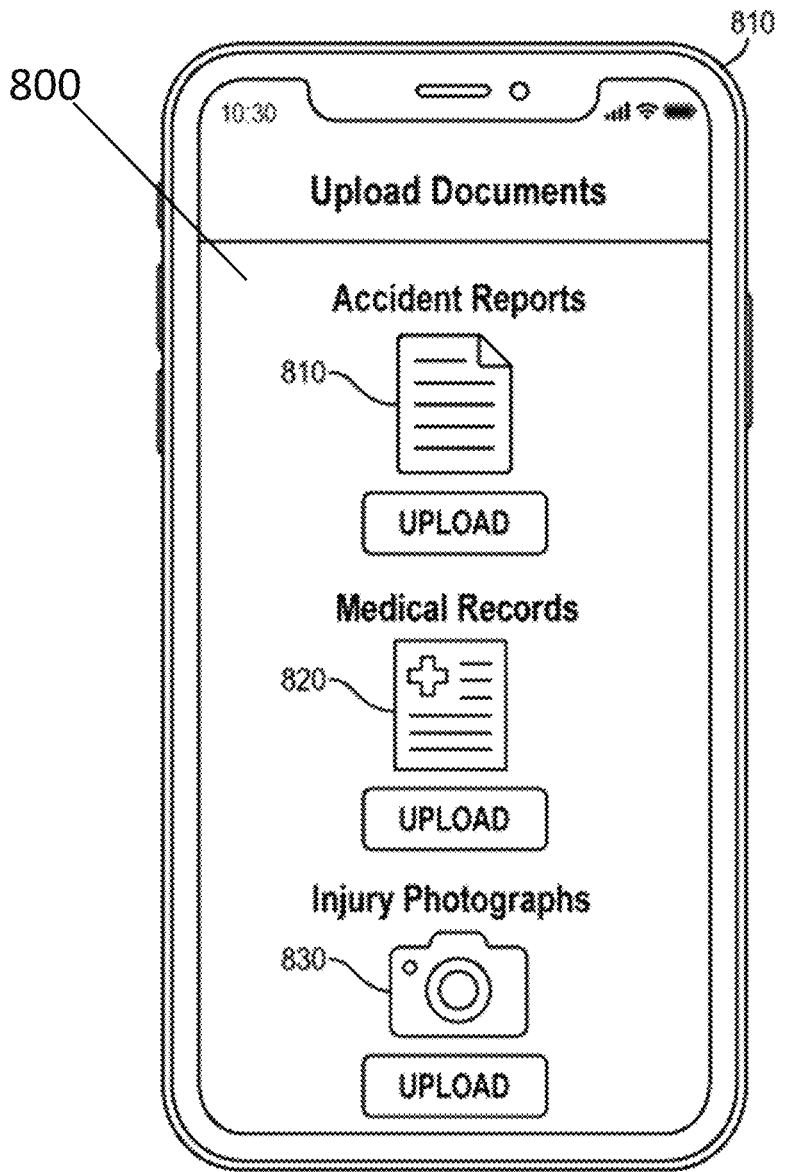
FIG. 8 is a schematic diagram illustrating an example user interface (UI) screen for uploading accident reports, medical documentation, and injury photographs through the mobile application, according to some embodiments.

FIG. 8 illustrates an example user interface screen 800 where the claimant uploads accident reports 810, medical records 820, and injury photographs 830 using the mobile application. The user interface screen 800 facilitates claim- ant-driven document uploads through a mobile application. The interface is divided into discrete sections corresponding to different types of evidence required for claims processing. In section 810, the claimant is prompted to upload accident reports, such as police reports, incident narratives, or on- scene diagrams. The application may support various file types, including PDF, DOCX, and image formats like JPEG or PNG, and may include an integrated document scanner to assist users in digitizing physical paperwork directly from the device's camera. Section 820 provides an upload option for medical records, allowing the claimant to submit phy- sician notes, hospital discharge summaries, treatment plans, and billing statements related to injury diagnosis and care. To streamline the process, the app may offer a direct integration with electronic health record (EHR) systems or enable batch uploads of multiple files through a single interface action. Data protection measures such as on-device encryption and secure channel transmission (e.g., HTTPS with TLS 1.3) are employed to safeguard sensitive health information during transfer.

In section 830, the interface allows for the upload of injury photographs, enabling the claimant to capture or select images showing physical injuries sustained from the accident. The application may guide users with tips for optimal photo quality, such as ensuring good lighting and multiple angles, to assist claims adjusters and AI valuation modules in accurately assessing injury severity. Uploaded images may be automatically compressed and metadata- tagged with timestamps and geolocation to enhance authen- ticity verification. Overall, user interface screen 800 exem- plifies a streamlined, secure, and claimant-friendly digital intake process that consolidates critical evidence uploads, enabling faster claims adjudication and minimizing admin- istrative overhead for both the claimant and the insurer.

Figure 9:
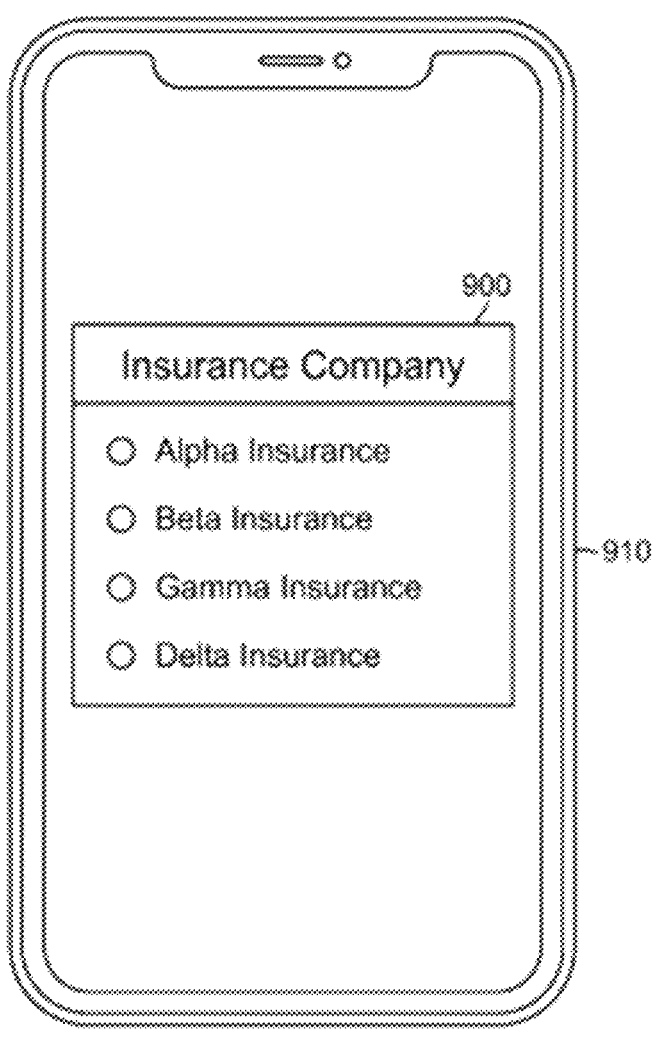
FIG. 9 is a schematic diagram illustrating an example user interface (UI) for selecting the liable insurance company from a database within the application, according to some embodiments.

FIG. 9 illustrates an example user interface screen 900 presenting a selectable list 910 of participating insurance companies, allowing the claimant to identify the liable insurer. FIG. 9 illustrates an example user interface screen 900 that displays a selectable list 910 of participating insurance companies, enabling the claimant to identify the liable insurer through a mobile application. The user inter- face 900 is structured to enhance user efficiency and accu- racy during insurer selection. The selectable list 910 includes a series of radio buttons or checkboxes aligned with insurer names such as "Alpha Insurance," "Beta Insurance," "Gamma Insurance," and "Delta Insurance," though the list may dynamically update based on the claimant's location, accident details, or policy information previously entered. In operation, the application may auto-populate the list 910 using geolocation data or claim metadata to prioritize likely insurers (e.g., showing insurers that issued policies in the claimant's region). Search functionality or alphabetical sort- ing may be included to assist users in locating the correct insurer if the list contains a large number of participants.

Once an insurer is selected, the system can trigger automated verification against a policy database, cross-referencing entered claim numbers, policyholder names, or VINs to prevent claimant error.

Examples of enhancements may include displaying the insurer's logo alongside its name to reduce misidentification, providing tooltips with contact information or claim submission guidelines for each insurer, or including an "Other" option with a manual entry field if the insurer is not listed. Additionally, if the claimant is unsure about the liable party's insurance carrier, the system may offer an assistance button to request human support or escalate to a manual verification team. Security measures may include temporarily caching selected choices on the device using encrypted storage and verifying the selection through secure APIs before final claim submission. By structuring the interface screen 900 with these usability and verification features, the claimant experience is streamlined, reducing processing errors and accelerating claim intake.

Figure 10:
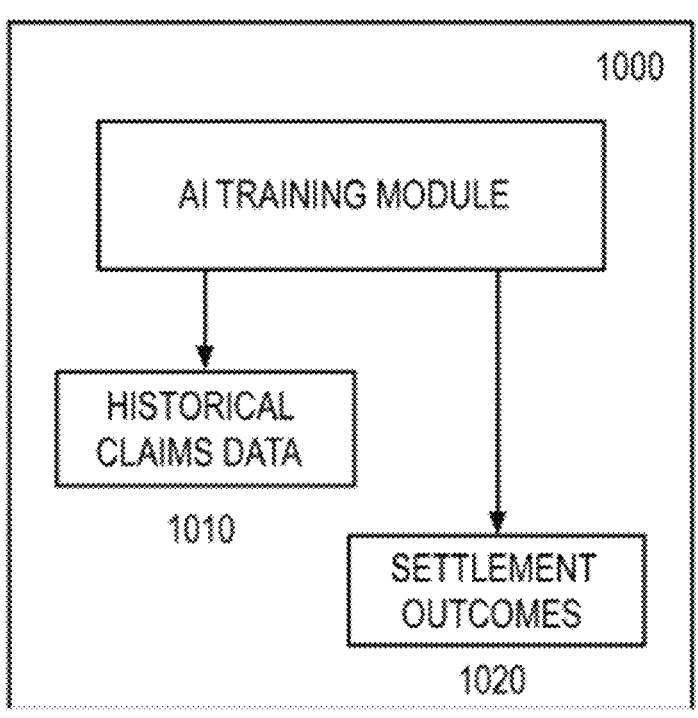
FIG. 10 is a block diagram illustrating an optional AI training system configured to improve settlement valuation predictions over time based on historical claims and outcomes, according to some embodiments.

FIG. 10 illustrates an optional AI training system 1000 configured to enhance settlement valuation accuracy by incorporating feedback from historical claims data 1010 and settlement outcomes 1020. The AI training system 1000 is configured to improve settlement valuation accuracy by systematically incorporating feedback derived from historical claims data 1010 and settlement outcomes 1020. The AI training system 1000 may include a training module implemented using supervised, semi-supervised, or reinforcement learning techniques that iteratively refines predictive models for claim valuation.

The historical claims data 1010 may comprise structured and unstructured datasets, including accident reports, injury descriptions, medical diagnoses, repair estimates, treatment costs, and litigation histories. For example, historical data may include a corpus of prior automobile accident claims along with metadata such as claimant demographics, vehicle damage appraisals, and incident geolocation. These inputs allow the system to identify patterns correlating initial claim attributes with final financial settlements. The settlement outcomes 1020 represent finalized payment amounts, claim resolution timelines, negotiation deviations, and legal proceedings where applicable. The outcomes serve as labeled ground truth for model training. For instance, if initial AI valuations systematically overestimated settlement amounts in minor injury claims, the training system 1000 can adjust its predictive weights to minimize future variance against actual paid amounts.

Examples of training techniques that may be used include gradient boosting machines (GBMs) retrained on error residuals between predicted and actual settlements, or deep learning models utilizing attention mechanisms to identify key determinants of claim variability. Additionally, the system 1000 may use reinforcement learning, where valuation policies are refined through simulation environments modeling negotiation dynamics. By continuously ingesting and learning from real-world feedback loops between projected valuations and actual outcomes, the AI training system 1000 enhances accuracy, reduces bias, and improves the reliability of automated claim assessments over time, ultimately contributing to faster settlements, reduced disputes, and better claimant satisfaction.

Figure 11:
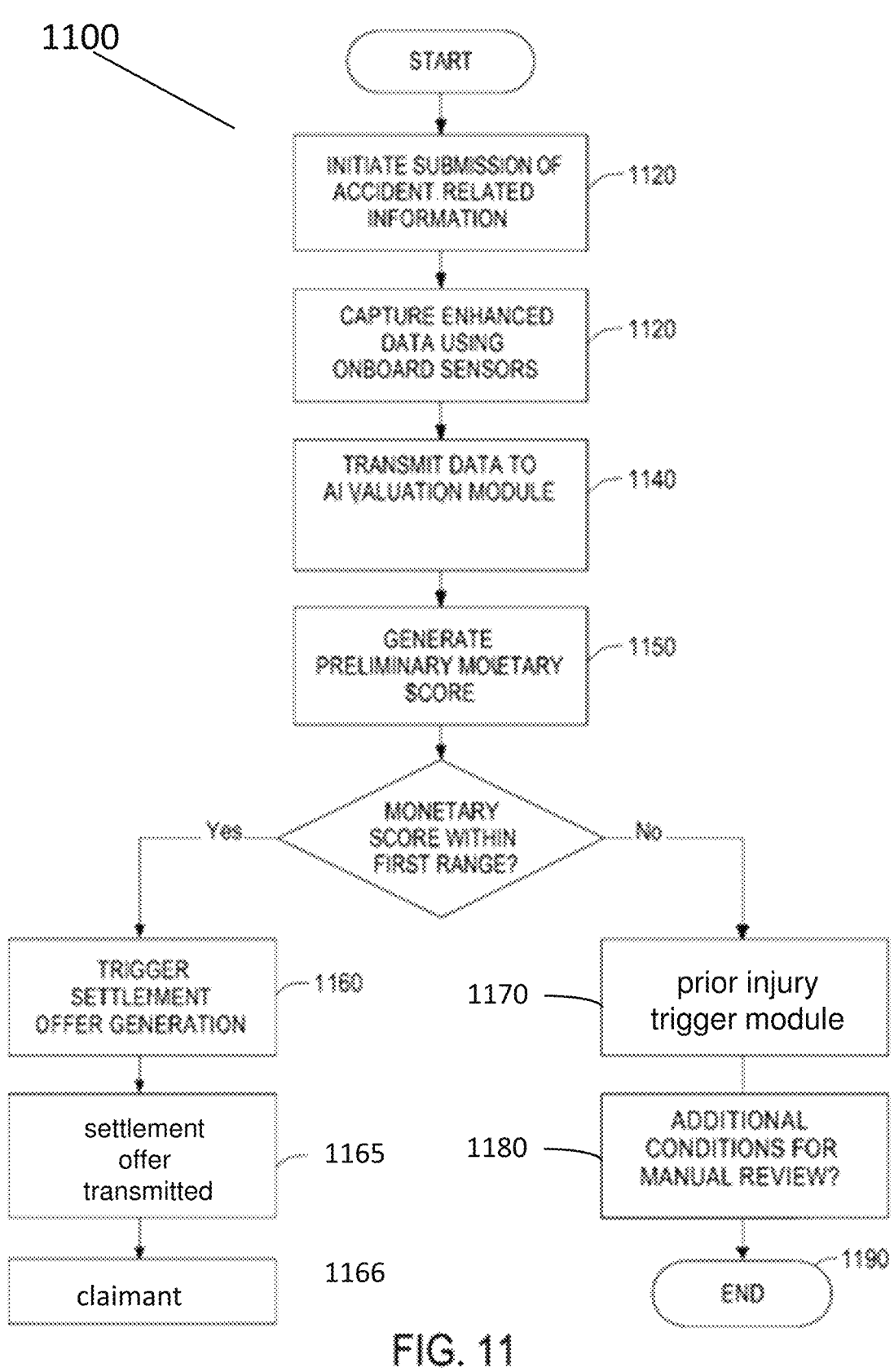
FIG. 11 is a flowchart illustrating an example AI-driven settlement valuation and workflow triggering method, in which sensor-derived injury data and uploaded claim documents are processed to generate a preliminary monetary score and automatically initiate either a settlement offer or a prior injury investigation based on preset thresholds, according to some embodiments.

FIG. 11 illustrates a flowchart 1100 depicting an AI-driven settlement valuation and workflow triggering method based on sensor-derived and uploaded claim data. The process begins at block 1110 where the claimant initiates the submission of accident-related information through a mobile application, including accident reports, medical records, and injury photographs. In block 1120, the mobile application captures enhanced data using onboard sensors, such as depth sensors and heat-mapping sensors, during the injury photograph capture process.

In block 1130, the collected structured data (e.g., text forms) and unstructured data (e.g., sensor-enhanced images) are transmitted securely to an AI valuation module. In block 1140, the AI module processes the incoming data using trained machine learning models, including convolutional neural networks (CNNs) for analyzing injury photographs and gradient-boosted decision trees (GBDTs) for evaluating structured claim information. Based on this multi-modal analysis, the AI module generates a preliminary monetary score reflecting the estimated value of the claim. Following score generation, decision block 1150 compares the monetary score against preset monetary thresholds. If the monetary score falls within a first range (e.g., approximately $500 to $4,000), the flow proceeds to block 1160, where a settlement offer generation module is triggered. This module compiles a digital settlement offer and a corresponding liability release agreement, which is transmitted 1165 to the claimant 1166 via the mobile application for electronic review and signature.

Alternatively, if the monetary score exceeds the first threshold (e.g., greater than approximately $4,000), the flow proceeds to block 1170, where a prior injury investigation trigger module is activated. In this case, the insurance company system prompts a deeper investigation into the claimant's past medical history and prior injuries to assess whether the current claim relates to pre-existing conditions. In parallel, block 1180 monitors for additional conditions that warrant manual review, such as inconsistent injury data, low confidence scores from the AI models, or missing supporting documentation. If such conditions are detected, the claim is flagged and routed to a human claims adjuster for further evaluation. The process ends at block 1190, where the selected workflow (settlement offer or investigation) is executed based on the outcome of the prior decision nodes.

In one embodiment, sensor data collected from the claimant's mobile device is processed by an AI valuation module to generate a preliminary monetary score associated with a personal injury claim. The mobile application prompts the claimant to upload accident-related documents, including accident reports, medical records, and photographs of injuries. In addition to static image uploads, the system leverages mobile device sensors, such as depth sensors (e.g., LiDAR) and thermal imaging sensors (e.g., infrared heat mapping), to gather enhanced data during the capture of injury photographs. For example, depth mapping allows the AI module to detect the surface swelling and extent of contusions, while heat mapping captures localized thermal anomalies indicative of inflammation or trauma. Images captured with these sensors are pre-processed on the device to extract spatial features, temperature gradients, and metadata including time, date, and GPS location, and are securely transmitted to the AI valuation system over encrypted channels.

Upon receipt, the AI valuation module processes the sensor-enriched data in conjunction with structured form data (e.g., accident type, injury descriptions, claimant's prior injury disclosures) and unstructured document data (e.g., text from uploaded accident narratives). The AI uses an ensemble of machine learning models, including convolutional neural networks (CNNs) for image analysis and gradient-boosted decision trees (GBDTs) for structured injury and report data. The CNN model interprets physical evidence such as visible bruising, lacerations, or airbag impact marks, assigning severity scores based on visual injury features combined with depth and thermal readings. Simultaneously, the GBDT model evaluates contextual factors such as the existence of an accident report, the documented presence of neck and back injuries, and the overall complexity of the incident.

The AI valuation module outputs a monetary score that represents an estimated claim value based on the entirety of the submitted evidence. This monetary score is not displayed to the claimant. Instead, it is routed directly to the insurance company's internal system as a preliminary, non-binding appraisal to guide early-stage settlement decisions. The generated monetary score is evaluated against predefined monetary thresholds. If the monetary score falls within a first range, approximately $500 to $4,000 based on a $10,000 policy limit, the system automatically triggers a settlement offer generation workflow. In this scenario, the insurer can quickly send a digital settlement offer to the claimant via the mobile application, accompanied by an electronic liability release form ready for signature. This process streamlines low-complexity claims, saving administrative resources and encouraging early resolution without exhaustive record review.

Conversely, if the monetary score exceeds approximately $4,000, the system triggers a prior injury investigation workflow. In this case, the insurer is alerted to conduct a deeper analysis of the claimant's medical history, past injury records, and pre-existing conditions, recognizing that the elevated score may warrant greater scrutiny before settlement. This mechanism discourages premature settlement on potentially high-value claims while ensuring that insurance carriers have sufficient information to assess long-term liability.

Furthermore, if heat or depth sensor data reveals trauma inconsistent with the claimant's narrative, or if the system detects missing supporting documentation for higher monetary scores, the AI may flag the claim for manual adjuster review. In addition, confidence scores generated by the AI models (e.g., low-confidence injury detection due to blurry images) may also automatically prompt human oversight to ensure the fairness and accuracy of the valuation. By combining traditional document intake, real-time mobile sensor integration, machine learning-based injury assessment, and automated workflow triggers based on monetary thresholds, the system provides an intelligent, scalable solution for preliminary settlement valuation while mitigating risk for both insurers and claimants.

Referring now to an embodiment, modern personal injury claim evaluation may begin with a mobile device configured to capture detailed data regarding a claimant's injuries. The mobile device may comprise one or more integrated sensors including, but not limited to, depth sensors such as LiDAR scanners, structured light projectors, or stereoscopic camera pairs. These sensors are configured to record high-resolution, three-dimensional images of visible injuries including, for example, bruising, swelling, burns, and airbag or seatbelt impact marks. In some embodiments, the mobile device further includes a thermal infrared sensor configured to scan injury sites and map heat profiles, thereby highlighting areas of inflammation or burn intensity. Additionally, conventional camera images of the accident scene, including images of vehicle damage, skid marks, and environmental surroundings, may be captured to provide contextual evidence of the severity and nature of the incident. Through these multimodal sensor inputs, the system generates a comprehensive dataset reflecting the size, shape, and temperature characteristics of each injury. This sensor-derived dataset provides quantifiable and objective metrics that enhance the accuracy of the injury assessment process.

Following initial data capture, the mobile device pre-processes the raw data locally. In one embodiment, on-device algorithms are configured to extract salient features such as injury area, perimeter, swelling volume, and surface contours based on the depth sensor outputs. Similarly, thermal images may be analyzed to calculate temperature distribution patterns and peak heat intensities, serving as indicators of inflammation severity. Scene photographs may be processed using computer vision techniques to assess property damage and extract environmental context. The result of the local processing stage is a reduced and encrypted dataset comprising extracted feature values and annotated imagery. The system then transmits the dataset to a central processing server hosting an artificial intelligence (AI) valuation module. Transmission occurs over secure communication protocols, such as Transport Layer Security (TLS) 1.3, thereby preserving confidentiality, authenticity, and data integrity during transit.

Upon receiving the transmitted data, the AI valuation module processes the input using one or more machine learning models. In some embodiments, convolutional neural networks (CNNs) are applied to image-based inputs to detect injury severity indicators and latent feature patterns, while gradient-boosted decision tree models, such as XGBoost, are applied to structured numerical features derived from the sensor data. The AI module, trained on historical personal injury claim datasets, evaluates how the injury evidence and contextual factors correlate with historical settlement outcomes. Based on the analysis, the AI module generates a monetary settlement value score corresponding to an estimated compensation value for the personal injury claim. The monetary value score is generated internally as a numeric output but is not displayed to the claimant or end-user through the mobile device. Instead, the score is securely transmitted to the insurance company's internal systems, such as an adjuster's dashboard or claims management platform, for internal review and further action. The sensor-enriched evidence enables the AI valuation module to provide a highly granular and data-driven preliminary assessment, which may serve as an initial basis for settlement evaluation.

In accordance with one embodiment, the system is configured to trigger specific settlement workflows based on the generated monetary score. If the predicted settlement value falls between approximately five hundred dollars and four thousand dollars, relative to an exemplary ten thousand dollar policy limit, the system may automatically initiate a settlement request generation process. In such a case, the system may generate a proposed release agreement offering the claimant a settlement within the recommended range and deliver the release form digitally through the mobile application interface. The claimant may review and accept the offer electronically, thereby expediting the resolution of lower-severity injury claims. Conversely, if the monetary value score exceeds approximately four thousand dollars, the system automatically generates an alert flagging the claim for prior injury investigation. In this scenario, the claim is referred to human insurance adjusters for review of any pre-existing medical conditions, historical injuries, or other relevant claimant background that may affect settlement valuation. Settlement offers are deferred pending the results of such investigative review. All triggered activities, including automatic settlement generation or flagging for investigation, are logged systematically within the insurer's claims processing system for auditing and compliance.

Throughout the operation of the system, human oversight is maintained. Insurance adjusters retain full control over final settlement determinations. The AI-produced monetary value serves only as a base recommendation and does not constitute an automatic final decision. Adjusters review the AI-generated valuation, the supporting sensor-derived injury evidence, and any investigative findings before authorizing settlement offers or payouts. If a settlement offer is proposed for a claim falling within the five hundred to four thousand dollar range, the adjuster may validate the offer parameters and approve transmission of the release form to the claimant. For claims flagged for prior injury investigation, adjusters may conduct deeper analysis of medical records, prior claim history, or policy coverage issues before proceeding. By providing a comprehensive, sensor-supported, and AI-augmented assessment platform, the system enhances the accuracy, consistency, and efficiency of personal injury claim evaluations while ensuring that final adjudication and settlement approval remain under the control of qualified human personnel. Thus, through the integration of mobile sensor technology, secure data transmission, advanced machine learning analysis, and human-in-the-loop settlement workflows, the described embodiment provides an improved system and method for personal injury claim valuation and settlement optimization.

Figure 12:
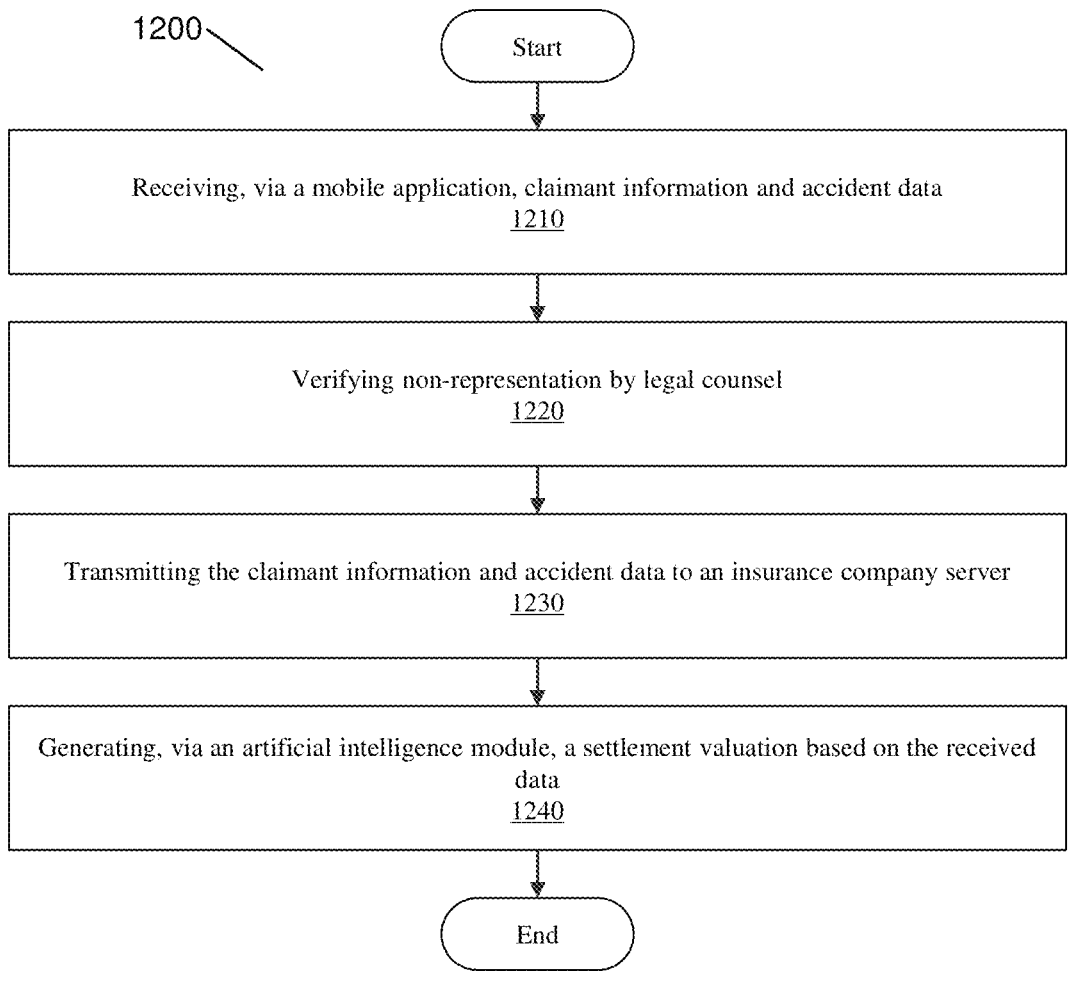
FIG. 12 is a flowchart illustrating a computer-implemented method for facilitating direct settlement negotiations, according to some embodiments.

FIG. 12 is a flowchart illustrating a computer-implemented method 1200 for facilitating direct settlement negotiations between a claimant and an insurance company, according to some embodiments of the present disclosure. At block 1210, the method may include receiving, via a mobile application, claimant information and accident data. At block 1220, the method may include verifying that the claimant is not represented by legal counsel. At block 1230, the method may include transmitting the claimant information and accident data to an insurance company server. At block 1240, the method may include generating, via an artificial intelligence (AI) module, a settlement valuation based on the received data. Based on the generated settlement valuation, the method may include triggering one or more settlement workflows, such as issuing a settlement offer or initiating a prior injury investigation.

In some embodiments, the method may further include prompting the claimant to upload accident reports, medical documentation, and photographic evidence. Photographic evidence may be analyzed using onboard depth sensors or heat mapping sensors to extract enhanced injury data. The extracted injury severity information may be used to adjust the settlement valuation dynamically. In some embodiments, the settlement valuation is transmitted exclusively to the insurance company and is not displayed to the claimant to prevent premature or inaccurate expectations.

In certain embodiments, if the settlement valuation falls within a predetermined range (e.g., approximately $500 to $4,000), the method may trigger automatic generation of a settlement offer. If the settlement valuation exceeds a predetermined threshold (e.g., greater than approximately $4,000), the method may instead initiate an internal review to investigate the claimant's prior injury history. Upon acceptance of a settlement offer, the method may further include presenting the claimant with an option to electronically execute a digital liability release agreement directly within the mobile application. Additionally, the insurance company server may identify claimant policy details by cross-referencing the uploaded accident report against existing customer databases. In some embodiments, the method may present selectable options within the mobile application allowing the claimant to identify a liable insurance company from a list. Factors contributing to the settlement valuation may include accident severity, medical treatment received, injury photographs, and historical accident data.

Figure 13:
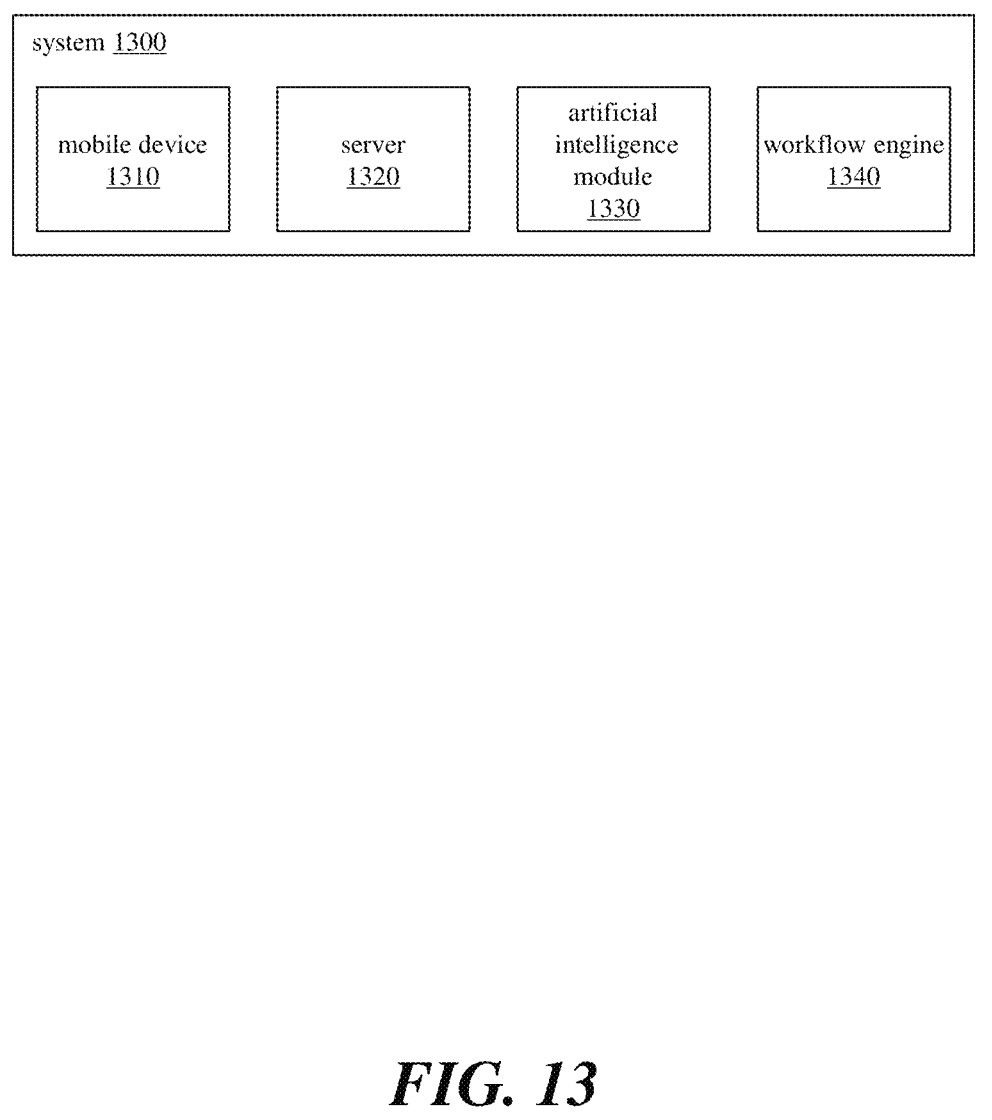

FIG. 13 is a block diagram illustrating a system 1300 for facilitating AI-driven settlement workflows, according to some embodiments of the present disclosure. In some embodiments, the system 1300 may include a mobile device 1310 and a server 1320 configured to communicate with one another over a network. The mobile device 1310 may be configured to receive claimant inputs, including accident data and supporting documentation. The server 1320 may be configured to receive transmitted claimant information from the mobile device 1310 and process the data accordingly.

The system 1300 may further include an artificial intelligence (AI) module 1330 communicatively coupled to the server 1320. The AI module 1330 may be configured to generate a settlement valuation based on the claimant information, supporting documentation, and sensor-derived data. Based on the settlement valuation generated by the AI module 1330, a workflow engine 1340 may be triggered. The workflow engine 1340 may be configured to initiate one or more settlement workflows, such as generating a settlement offer or initiating a prior injury investigation based on predetermined valuation thresholds.

In some embodiments, the mobile device 1310 may include one or more integrated sensors, such as depth sensors or thermal imaging sensors, configured to capture injury evidence associated with the accident. The captured sensor data may be transmitted securely to the server 1320 for analysis by the AI module 1330. In some embodiments, the server 1320 may identify the liable insurance company based on a claimant-provided selection made within the mobile application interface. In certain embodiments, the workflow engine 1340 may transmit a settlement offer to the claimant via the mobile application and facilitate execution of a digital liability release agreement through an electronic signature process. In some embodiments, the server 1320 may maintain a secure database of participating insurance companies and corresponding communication endpoints to streamline settlement negotiations.

Figure 14:
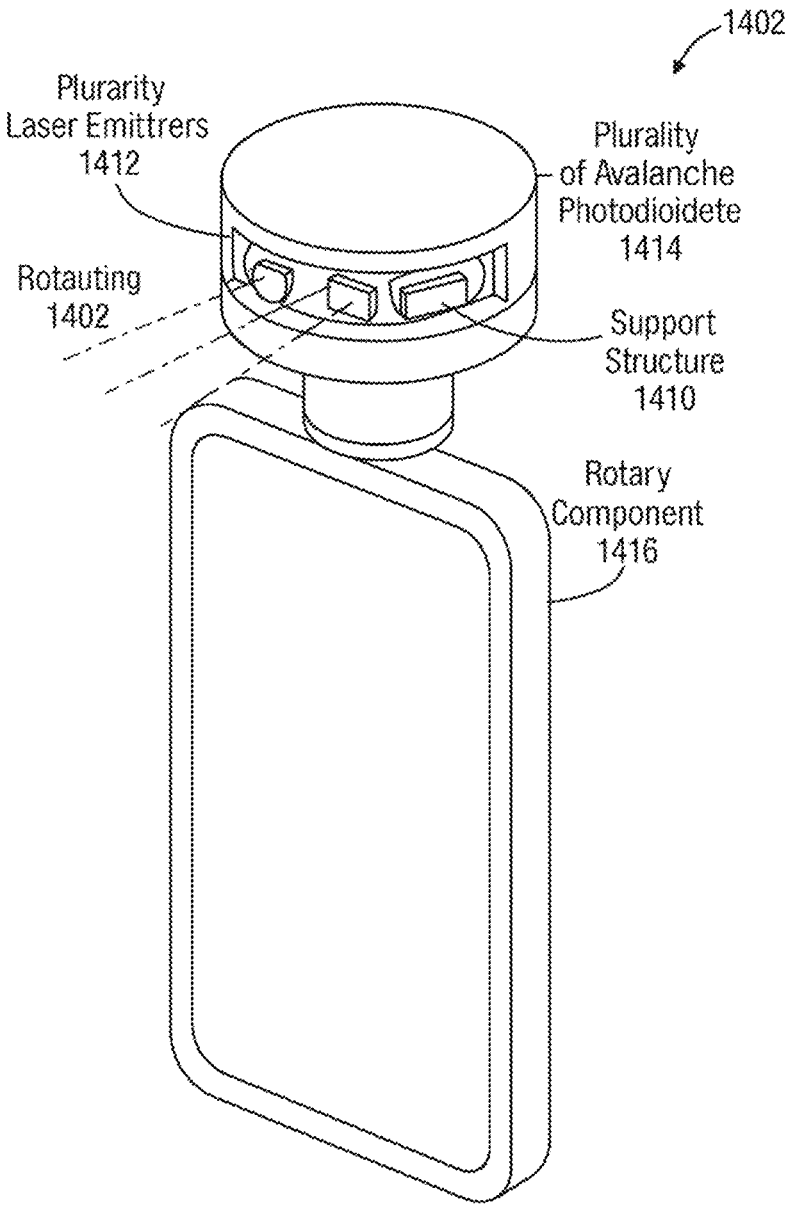
FIG. 14 illustrates a perspective view of a LiDAR-based scanning assembly mounted on an electronic mobile device, including labeled components such as a rotary component, a plurality of laser emitters, a plurality of avalanche photodiode detectors, and a support structure, in accordance with an embodiment of the invention.

FIG. 14 shows a LiDAR-based scanning assembly 1402 integrated with an electronic mobile device, such as a smartphone or tablet. The LiDAR-based scanning assembly 1402 includes a support structure 1410 which mechanically retains and spatially aligns a plurality of laser emitters 1412 and a plurality of avalanche photodiode detectors 1414. The laser emitters 1412 are configured to emit pulsed light signals, which are directed toward a target surface, such as a portion of a claimant's body, to generate a depth map. The avalanche photodiode detectors 1414 are configured to detect the light pulses reflected from the target surface and convert them into time-resolved electrical signals.

The LiDAR-based scanning assembly 1402 further includes a rotary component 1416, which supports the support structure 1410 and is configured to rotate the array of laser emitters 1412 and avalanche photodiode detectors 1414 about a central axis. In some embodiments, the rotary component 1416 rotates at a speed ranging from approximately 100 to 350 revolutions per minute (RPM) to provide dynamic coverage of the surrounding environment and facilitate high-resolution three-dimensional surface mapping. The integration of the scanning assembly 1402 into a mobile electronic device enables portable and real-time injury documentation. The system may additionally include on-device preprocessing and motion correction modules to improve scan accuracy during handheld operation. The spatial data collected from the scanning assembly is transmitted to a remote processing server for further evaluation, including artificial intelligence-based settlement valuation and workflow automation as described in other embodiments.

In one embodiment, the system includes a mechanical support structure formed of lightweight, impact-resistant polymer or machined aluminum, such as polycarbonate or anodized aluminum alloy, configured to house and align a plurality of light-emitting components and corresponding photodetector elements. The light-emitting components may include vertical-cavity surface-emitting lasers (VCSELs) or edge-emitting semiconductor lasers, such as 850 nm or 905 nm class 1 eye-safe laser diodes. The photodetector elements may include silicon avalanche photodiodes (APDs) or single-photon avalanche diodes (SPADs) arranged to spatially correspond to each laser emitter and capture reflected light signals with high temporal resolution.

A rotational actuation mechanism is operatively coupled to the support structure and is implemented using a brushless DC motor or miniature stepper motor, which is electronically controlled to rotate the emitter-detector array about a central axis. The rotation speed is adjustable and may range from approximately 100 revolutions per minute (RPM) to approximately 350 RPM depending on the scan mode and target geometry. A rotary encoder or inertial sensor may be included to track angular position and stabilize sampling intervals during high-speed rotation.

During operation, the light-emitting components emit short-duration pulsed signals, typically in the nanosecond range, toward the target region of the claimant's body, such as the skin surface of a limb, contusion, or other externally visible injury. The reflected light is detected by the photodetector elements, which convert the return pulses into electrical signals sampled at high temporal resolution. These signals are used to calculate depth values based on the time-of-flight (ToF) of the emitted and received pulses, enabling reconstruction of a dense three-dimensional injury map.

To enhance scan quality, a motion correction and scan verification subsystem is provided, which includes a combination of inertial measurement units (IMUs), such as 3-axis gyroscopes and accelerometers, along with signal analysis software executing real-time filtering and frame alignment. This subsystem detects motion-induced distortions due to hand jitter or user movement and applies geometric correction algorithms to the raw point cloud. If scan completeness or spatial integrity falls below a predefined quality threshold, the subsystem prompts the user to reacquire affected portions of the scan region.

The mobile device communicates wirelessly, e.g., via LTE, 5G, or Wi-Fi, with a remote server that receives claimant inputs (e.g., demographic data, accident metadata, and medical records) along with the generated spatial injury representation. An artificial intelligence module hosted on the server is operatively coupled to process the incoming data using trained machine learning models, such as convolutional neural networks (CNNs) for image-based interpretation and gradient-boosted decision trees (GBDTs) for structured injury valuation. The AI module produces a settlement valuation based on input features extracted from the injury profile and contextual claim data.

A workflow engine, implemented in software on the server infrastructure, then uses the output of the AI module to trigger an appropriate downstream path. If the valuation falls within a defined payout threshold, the workflow engine generates a proposed settlement offer and transmits it along with a digital release agreement to the claimant's device. If anomalies are detected or the claim exceeds defined thresholds, the engine initiates a prior injury investigation, which may include querying historical insurance records or escalating the case for manual adjuster review.

In accordance with some embodiments, the disclosed system provides specific improvements to the functioning of computer architecture by integrating hardware-level and software-level innovations that collectively enhance data acquisition, processing accuracy, and workflow automation within a constrained mobile-to-server computing environment. The system modifies conventional computing infrastructure by embedding a coordinated hardware-software sensor fusion layer within mobile devices, specifically, combining depth sensing (e.g., LiDAR), thermal imaging, and conventional image capture hardware into a unified input pipeline. This pipeline includes preprocessing logic that extracts, compresses, and encrypts relevant spatial, thermal, and visual features prior to transmission.

On the server side, the architecture departs from generic cloud processing by incorporating a real-time workflow engine coupled to an artificial intelligence valuation module. This module performs multi-modal data fusion, correlating structured claimant inputs with sensor-derived features using optimized parallel processing pipelines, such as those enabled by GPU-accelerated convolutional neural networks (CNNs) and gradient-boosted decision trees (GBDTs). This fusion architecture allows the system to produce low-latency valuation scores, enabling just-in-time branching into appropriate settlement workflows (e.g., automated offer generation or prior injury investigations).

In some embodiments, the system's architecture introduces a non-trivial improvement over traditional computing models by transforming mobile devices into edge computing nodes capable of intelligent data compression and relevance filtering. These edge enhancements reduce bandwidth load and processing latency, while also improving valuation precision. The resulting architecture is not a generic application of known components, but a purpose-built system that materially improves computer functionality in the context of real-time, sensor-enhanced, AI-assisted injury claim valuation. These improvements are technical in nature and not merely an abstract idea implemented on a computer.

At the systems level, the LiDAR sensor can be significantly enhanced through a series of integrated hardware and software improvements designed to increase accuracy, reliability, and operational efficiency in injury documentation contexts. One key enhancement involves the incorporation of a multi-sensor fusion framework, wherein the LiDAR sensor is coupled with an RGB camera, an infrared thermal imaging sensor, and an inertial measurement unit (IMU). This combination allows the system to generate more accurate and context-rich depth maps by compensating for occlusions and hand-held motion during scanning. Additionally, the system can be configured to support dynamic resolution and range adaptation, whereby a software-controlled mechanism adjusts the scan rate and resolution based on the proximity and complexity of the target scene, allowing for high-detail injury scans when necessary and conserving resources otherwise.

The present disclosure provides a system and method for facilitating direct settlement negotiations between injury claimants and insurance companies by leveraging a mobile computing platform equipped with an integrated LiDAR-based injury documentation subsystem and a remote artificial intelligence (AI) processing module. The system delivers a technical improvement over conventional legal and insurance workflows by enabling contactless, accurate, and automated injury assessment using three-dimensional spatial scanning, followed by intelligent valuation and settlement workflow triggering. Unlike traditional systems that rely on two-dimensional photographs or subjective self-reporting, the disclosed system utilizes a LiDAR scanning assembly to generate high-resolution injury profiles based on depth measurements, even under conditions of hand motion or environmental variability.

In one embodiment, the mobile device includes a LiDAR-based injury mapping assembly comprising a support structure housing an array of light-emitting components and corresponding photodetectors. These components are mounted on a rotational mechanism capable of operating at speeds between approximately 100 and 350 revolutions per minute (RPM). During operation, the system emits pulsed light signals toward a target area of the claimant's body, such as a bruised or swollen region. Reflected light signals are captured by the photodetectors and sampled to generate digital return waveforms consisting of signal amplitude values over time. A peak detection algorithm identifies the maximum amplitude of each waveform, and a localized curve-fitting routine is applied to a small window of adjacent samples surrounding the peak. This allows the system to estimate a sub-sample timestamp that corresponds to the center of the return pulse, thereby enabling precise round-trip time-of-flight (ToF) calculations. The distance from the emitter to the scanned surface is determined from the ToF measurement and used to build a three-dimensional point cloud representing the injury.

To ensure reliability, the LiDAR subsystem includes a motion correction and scan verification module. This module compensates for handheld movement during scanning by realigning frames and filtering out artifacts. Additionally, it assesses scan completeness in real time and prompts the user to re-scan if gaps or occlusions are detected in the injury profile. The generated point cloud is then converted into a spatial injury map that includes surface topography, volume data, and geometric attributes relevant to injury severity.

Once captured, the injury map and associated claimant data, including accident reports, medical records, and structured metadata, are securely transmitted to a remote server via an encrypted network connection. The server includes an artificial intelligence module trained on large datasets of prior personal injury cases. This module processes the incoming information using machine learning algorithms, such as gradient-boosted decision trees and convolutional neural networks, to generate a predicted settlement valuation based on injury characteristics, jurisdictional norms, and historical outcomes. The valuation result is then analyzed by a workflow engine that determines the next course of action.

If the valuation falls within a defined monetary range, such as $500 to $4,000, the system triggers the automated generation of a digital settlement offer and corresponding release agreement. These documents are sent to the claimant's mobile device for review and electronic signature via the user interface. Alternatively, if the valuation exceeds the threshold or if confidence metrics indicate potential anomalies, the system initiates a prior injury investigation. In this mode, the server queries external medical and insurance databases to assess whether the current injury may be related to a pre-existing condition, and the case may be flagged for manual review by an insurance adjuster.

The disclosed architecture includes a mobile device equipped with sensor control logic, data encryption hardware, and user interaction modules; a LiDAR subsystem with rotational scan control, pulse timing, and signal processing algorithms; and a server infrastructure comprising AI processing units, policy databases, and digital workflow automation modules. Together, these components form a tightly integrated system that provides real-time, automated, and evidence-based claim assessment while maintaining compliance with data security and legal standards.

This system addresses a specific technical problem, namely, the difficulty of capturing reliable injury data with handheld mobile devices under variable conditions. By introducing LiDAR-based three-dimensional scanning with embedded motion correction, sub-sample time-of-flight estimation, and AI-driven valuation, the invention materially improves the precision and efficiency of injury claim documentation and processing. The system enables automated workflows that would otherwise require manual review and legal oversight, reducing delay and cost while increasing fairness and transparency for claimants and insurers alike.

To further improve system efficiency, a lightweight neural network model (e.g., a TinyML implementation) can be deployed directly on the mobile device to preprocess LiDAR-generated point clouds, performing tasks such as denoising, injury boundary detection, or semantic filtering prior to data transmission. This edge-based preprocessing reduces bandwidth requirements, minimizes privacy risks, and offloads computational demand from backend servers. Complementing this, a depth confidence and error correction module may be implemented to quantify uncertainty in LiDAR measurements using cross-validation with stereo vision or structured light inputs. This enables the system to flag unreliable scans for re-capture or manual review, thereby improving the integrity of injury assessments.

Environmental adaptability can be further achieved by integrating an ambient light and surface reflectivity compensation module, which dynamically adjusts LiDAR pulse intensity and filtering parameters in response to external lighting conditions and surface properties of the subject (e.g., wet or shiny skin). To capture temporal injury characteristics, the LiDAR system may include a burst-mode capture engine that records short sequences of depth data at high frame rates (e.g., 10-30 fps) to analyze micro-movements such as tremors, swelling, or joint instability over time, providing a dynamic profile of the injury. Power efficiency is improved by integrating a modular power management interface that coordinates energy usage across the LiDAR, thermal, and camera sensors, dynamically throttling power consumption based on real-time usage patterns and system state.

In some embodiments, the system may incorporate secure embedded firmware that validates data integrity using cryptographic checksums and performs anomaly detection to identify spoofed or manipulated inputs prior to encoding and transmission. This added security ensures the evidentiary value of injury documentation in legal or insurance contexts. Together, these systems-level enhancements transform the LiDAR sensor from a passive depth recorder into an intelligent, adaptive, and secure injury analysis module optimized for real-time deployment in mobile claims processing environments.

FIGS. 15A and 15B collectively illustrate a flow diagram 1500 of an example method executed by a computing system for facilitating direct injury claim settlements, including automated injury documentation, distance measurement using LiDAR, and AI-driven valuation workflows. As shown in step 1501, the system initiates the process by verifying, through a graphical user interface of a mobile device, that the claimant is not represented by legal counsel.

This ensures that the claimant is eligible for direct settlement processing without legal intermediary requirements. In step 1502, the system receives, via the mobile device, claimant-submitted data that includes structured accident metadata (such as date, location, and parties involved), relevant medical documentation, and one or more images of the injury. In step 1504, the system activates a LiDAR-based sensing unit integrated within the mobile device to perform real-time injury surface scanning. This process includes several sub-steps: At step 1506, the system emits a modulated light pulse from a light-emitting component (such as a VCSEL or edge-emitting diode). At step 1508, the system receives the reflected pulse via a time-gated photodetector array (such as an avalanche photodiode array). At step 1510, the system generates a digital return waveform comprising a sequence of sampled signal amplitudes over time. The waveform is then analyzed to extract depth information. In step 1512, the system detects a local peak amplitude within the waveform and selects a window of neighboring samples around the peak. In step 1514, the system applies a localized curve-fitting algorithm, such as a spline, Gaussian, or polynomial fit, to the selected sample window in order to determine a sub-sample timestamp corresponding to the estimated center of the return pulse.

Referring to FIG. 15B, in step 1516, the system calculates the round-trip time of flight (ToF) of the light pulse using the sub-sample timestamp and a known propagation speed of light. In step 1518, the distance to the scanned surface is computed based on the ToF value, and a three-dimensional injury profile is generated using the aggregate of depth measurements. In step 1520, the system transmits the claimant data and the three-dimensional injury profile over an encrypted communication channel, such as a TLS-secured Wi-Fi or cellular connection, to a remote server associated with the insurance company. Upon receiving the data, the server-side artificial intelligence (AI) module processes the information at step 1522. The AI module is configured to apply trained machine learning models, including, for example, neural networks and regression trees-based on the injury profile, accident metadata, and historical case data to generate a predicted settlement valuation.

At step 1524, the system triggers a settlement workflow depending on the valuation outcome and associated decision logic. If the valuation falls within a predetermined threshold, the system may (a) generate and transmit a digital settlement offer accompanied by a release agreement. Alternatively, if the valuation exceeds thresholds or indicates inconsistencies, the system may (b) initiate a prior injury verification procedure to evaluate whether the injury may relate to a pre-existing condition or earlier claim. The process may then terminate or proceed to additional manual or automated steps based on user acceptance or insurer escalation. FIGS. 15A and 15B thus depict a technical implementation that integrates real-time LiDAR sensing, signal processing, secure data transmission, and artificial intelligence in a structured settlement workflow.

Figure 16:
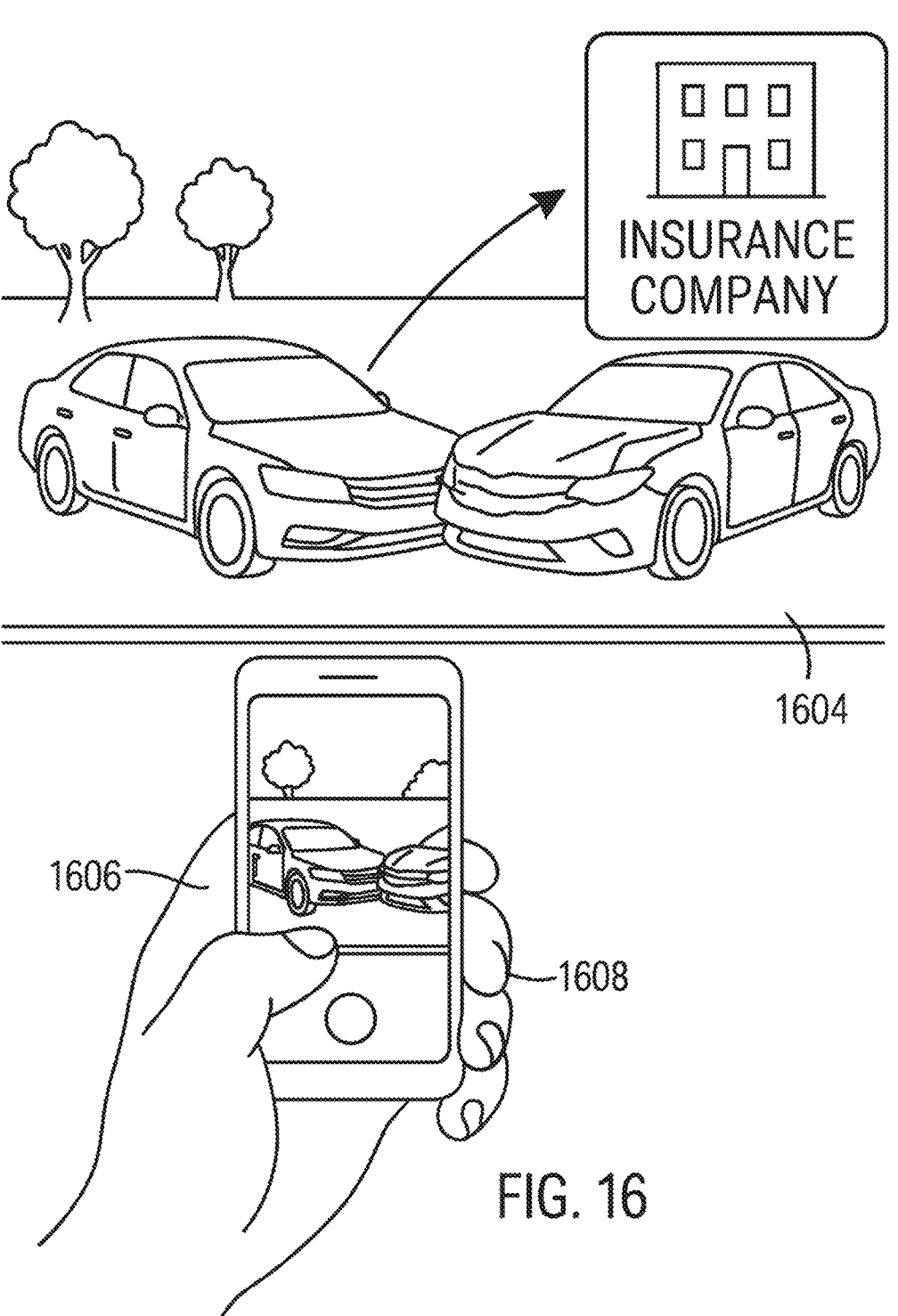
FIG. 16 illustrates a system architecture in which a mobile device, such as a smartphone, is used to capture and transmit digital photo evidence of a vehicle collision to an insurance company, while also supporting bidirectional communication to initiate and manage an insurance claim, according to some embodiments of the present disclosure.

FIG. 16 illustrates a system architecture in which a mobile device, such as a smartphone 1608, is used to capture and transmit digital photo evidence of a vehicle collision to an insurance company 1602, while also supporting bidirectional communication to initiate and manage an insurance claim. In this example, a user holds the smartphone 1608 in one hand 1606 and positions it to capture a photo of a crash scene involving two vehicles shown in front of the device, situated on a roadway or parking lane 1604. The smartphone 1608 includes an integrated digital camera and display, enabling the user to view a live preview of the scene on-screen before capturing the image. The damaged vehicles may include passenger cars, motorcycles, or commercial transport vehicles, and the damage may involve bent metal, shattered glass, or deformed structural components.

Once the image is captured, the mobile device initiates a wireless transmission to a backend system associated with the insurance company 1602. The transmission path is depicted by a directional arrow from the smartphone to the server and may utilize communication protocols such as 5G, LTE, Wi-Fi, or other IP-based secure channels. The transmitted image data may include embedded metadata such as time, date, GPS coordinates, user identity, device ID, and automated annotations highlighting the damage zones. Importantly, the system supports bidirectional communication, allowing not only for outbound transmission of photographic evidence from the smartphone 1608 to the insurance company 1602, but also for inbound messages and data from the insurance server back to the mobile device. Upon receiving the photo, the insurance company system may respond with an automated acknowledgment, a claim reference number, or a request for additional data such as a voice statement, driver's license scan, or additional photo angles. The communication exchange may occur within a secure mobile application installed on the device, offering real-time interaction with claim processing workflows.

The receipt of photo evidence at the insurance company 1602 may trigger a backend claims processing engine or artificial intelligence module, which uses image analysis algorithms to identify the type and extent of vehicle damage. Based on pre-established rules or predictive models, the system may automatically initiate a new insurance claim, associate the transmitted image with the claim file, and generate a preliminary claim number. The insurance company may send a confirmation back to the user via the mobile device, along with prompts for additional documentation or guided next steps (e.g., uploading repair estimates, locating a service provider, or scheduling a tele-assessment).

This closed-loop communication loop, comprising evidence capture, data transmission, claim initiation, and follow-up guidance, enables faster, more accurate, and user-friendly processing of automobile accident claims. FIG. 16 thus depicts a mobile-enabled evidence collection and claims automation system that reduces friction, lowers processing time, and improves claimant experience through technical integration of image capture, metadata transmission, secure network communication, and bidirectional real-time messaging between the claimant and the insurance provider.

Figure 17:
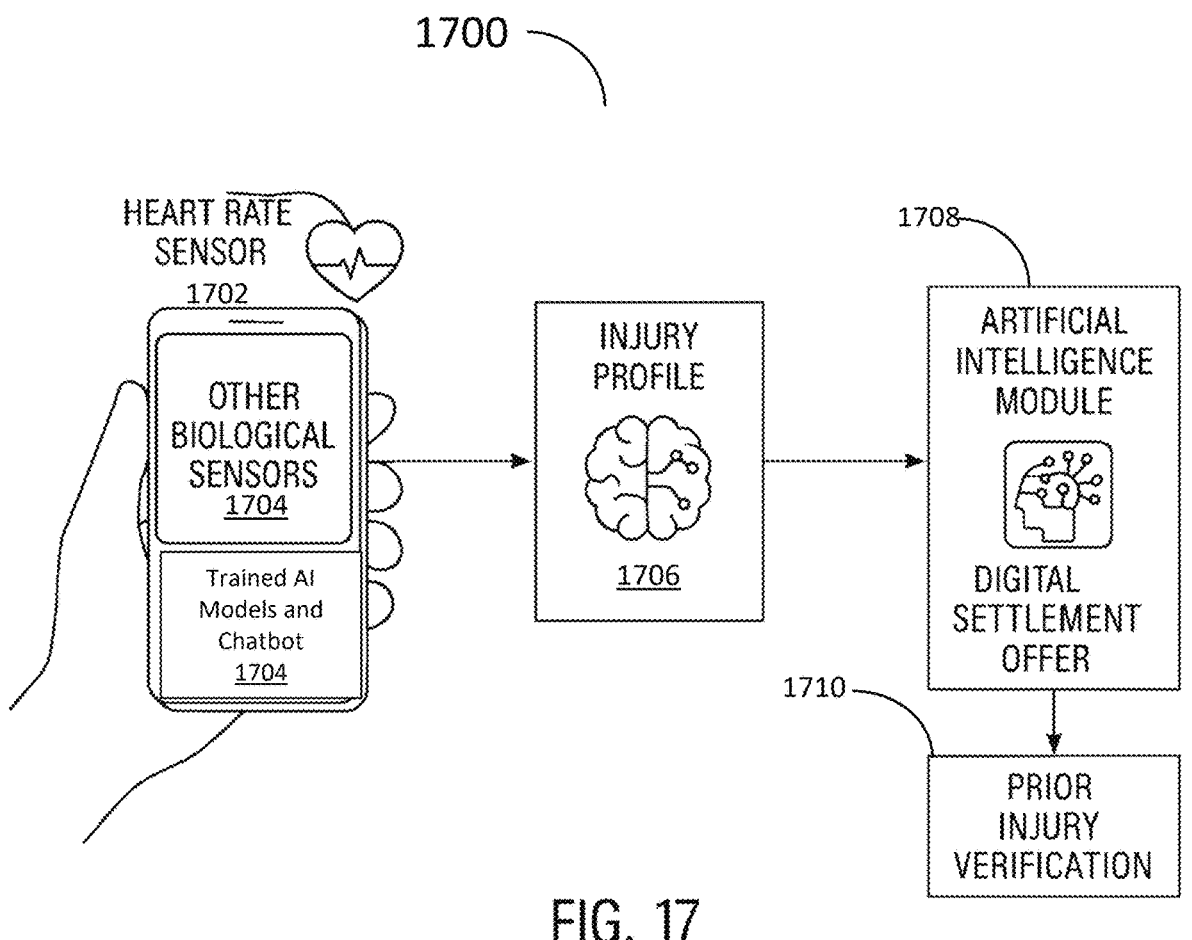
FIG. 17 is a schematic diagram illustrating a system for using biological sensor data from a mobile device to augment an injury profile, which is processed by an artificial intelligence module to generate a settlement valuation and trigger an automated insurance claims workflow, in accordance with one or more embodiments.

FIG. 17 depicts an embodiment of a system 1700 for facilitating injury claim processing by integrating biological sensor data captured from a mobile device into an injury profiling and settlement workflow pipeline. The system 1700 includes a mobile computing device equipped with a heart rate sensor 1702 and other biological sensors 1704, such as a skin temperature sensor, galvanic skin response (GSR) sensor, blood oxygen saturation sensor ($SpO_2$), or electrodermal activity (EDA) sensor. These sensors are integrated into the housing of the mobile device or communicatively paired via a wearable device (e.g., smartwatch, smart ring, or biometric wristband). The biological sensors 1704 are configured to measure acute physiological markers of distress, which may be indicative of injury severity or psychological trauma at the time of an accident.

The mobile device further includes trained AI models 1704, which are locally stored or accessed via a secure cloud connection. These models may perform initial preprocessing or filtering of the raw sensor data to normalize readings, detect outliers, and classify distress signatures associated with blunt trauma, high emotional stress, or shock. The processed biological data is incorporated into a broader injury profile 1706, which also includes visual injury scan data (e.g., LiDAR-based spatial mapping), accident metadata (e.g., location, date/time, vehicle speed), and structured claimant input (e.g., self-reported pain level or symptoms). The injury profile 1706 serves as a unified data object representing the claimant's physiological and contextual condition immediately following the incident.

The injury profile 1706 is transmitted to an artificial intelligence module 1708 hosted on a remote insurance company server or within a federated AI platform. The AI module 1708 applies trained machine learning models, including neural networks, decision forests, or ensemble classifiers, trained on historical claims datasets. These models analyze the injury profile in conjunction with past claim outcomes, jurisdictional regulations, and medical compensation benchmarks to compute a predicted settlement value. Based on the AI-generated valuation, the system triggers a downstream settlement workflow. If the valuation falls within a predetermined risk band, a digital settlement offer is generated and optionally includes a digital release agreement for claimant review and signature. If the AI module 1708 detects anomalies or confidence thresholds are not met, the system initiates a prior injury verification 1710 process, which may involve checking the claimant's medical history, scanning prior claims databases, or flagging the case for manual adjuster review. System 1700 thus enables end-to-end injury claim automation by leveraging real-time biometric inputs, sensor-derived physiological indicators, and historical AI inference models. The integration of biological sensor data into legal and insurance decision-making processes represents a technical improvement in the speed, accuracy, and objectivity of post-accident assessments.

In some embodiments, the blood pressure sensor, gyroscope, and accelerometer are embedded directly within the mobile computing device, enabling continuous, unobtrusive monitoring of physiological and kinematic parameters without requiring external peripherals. When one or more of these embedded sensors detects a value exceeding a predefined threshold, the system interprets the anomaly as indicative of a possible injury or accident and automatically triggers deployment of a chatbot to initiate an injury claim sequence. For instance, a systolic blood pressure reading in the range of about 130 to about 160 mmHg may reflect moderate physiological stress, such as from a minor collision or sudden emotional shock; values from about 160 to about 180 mmHg may suggest acute pain or trauma, and readings above about 180 mmHg may indicate severe physical distress. Diastolic values above about 90 mmHg, and particularly those exceeding about 100 mmHg, may support similar inferences.

In parallel, the mobile device's integrated accelerometer may register sudden linear accelerations ranging from about 1.5 g to about 2.0 g, indicative of a jolt or minor fall; from about 2.0 g to about 3.0 g, suggestive of a fall or vehicular impact; and above about 3.0 g, correlating with high-impact trauma. The gyroscope may detect abrupt rotational movements in the range of about 200 to about 300 degrees per second for sudden turns or twisting injuries, and above about 300 degrees per second for rollover or violent impact scenarios. Barometric and inertial sensors may also detect vertical displacement events ranging from about 0.3 to about 0.7 meters in about 0.5 seconds (e.g., slipping from a chair) to about 1.0 to about 2.0 meters in under one second (e.g., falling down stairs).

Upon detecting such thresholds, the system deploys a chatbot interface that prompts the user to authenticate the incident via device-integrated biometric verification, such as fingerprint scanning, facial recognition, passcode entry, or voice authentication. Once authenticated, the chatbot not only logs the incident data and timestamps the physiological readings but also triggers a subsequent action in the claims management workflow. Specifically, the chatbot transmits the authenticated event package, including sensor readings, location, timestamp, and user confirmation, to a remote injury profiling engine hosted in the insurer's cloud infrastructure. This engine may automatically open a new claim file, classify the severity level using rule-based or machine learning models, and notify an adjuster or initiate a medical triage referral.

The technical benefit of this system architecture is multifold: by embedding sensors in the mobile device, it enables always-on passive detection without requiring user effort; by automating chatbot deployment and claim initiation, it ensures rapid response in real-time scenarios; and by triggering backend actions only after secure, authenticated confirmation, it enhances data integrity, reduces false positives, and improves fraud resistance. This cohesive pipeline, from sensor threshold detection to chatbot activation to automated backend processing, optimizes both the user experience and the efficiency of injury claims handling.

The disclosed system addresses several technical problems through the integration of embedded mobile sensors, biometric authentication, and automated chatbot deployment for injury claim initiation. One key technical problem solved is the delay and inaccuracy associated with traditional injury reporting methods, which often rely on manual user input after the fact. By leveraging onboard sensors such as accelerometers, gyroscopes, blood pressure monitors, and heart rate sensors, the system enables passive, continuous monitoring and real-time detection of abnormal physiological or movement-related events. Thresholds such as a systolic blood pressure of about 160 to about 180 mmHg or an acceleration spike of about 2.5 g to about 4.0 g allow the system to detect potential injuries the moment they occur, automatically and objectively, without user initiation.

Another technical problem addressed is the lack of secure, efficient, and trustworthy claims initiation from mobile environments. The system resolves this by requiring device-based biometric authentication, such as fingerprint, facial recognition, or voice authentication, before allowing the user to proceed with a claim. This ensures that the claimant is authenticated and present at the time of initiation, reducing the risk of fraudulent or erroneous submissions. The system further solves the technical challenge of automating end-to-end claims workflows in resource-constrained environments by tightly integrating local sensor detection, UI logic through a chatbot interface, and remote claims management infrastructure. The chatbot acts as both an interface and an orchestration agent that triggers downstream actions, such as logging the event, packaging sensor data, and forwarding it to a cloud-based triage engine.

Additionally, the system addresses the technical challenge of interpreting noisy or ambiguous data from single-sensor systems by employing a multi-sensor fusion approach. By combining readings across different modalities, such as elevated blood pressure in conjunction with sudden rotational velocity or a vertical drop, the system increases contextual accuracy and reduces false positives. This enables differentiated triage based on severity, supports dynamic claims prioritization, and enhances decision-making reliability. Collectively, these features provide technical benefits in terms of improved system responsiveness, data integrity, security, and automation within mobile injury detection and claims processing workflows, representing concrete improvements to the functioning of the computing system itself.

EXAMPLES

Clause 1. A computer-implemented method for facilitating direct settlement negotiations between a claimant and an insurance company, comprising: receiving, via a mobile application, claimant information and accident data; verifying non-representation by legal counsel; transmitting the claimant information and accident data to an insurance company server; generating, via an artificial intelligence module, a settlement valuation based on the received data; triggering, based on the settlement valuation, one or more settlement workflows including issuing a settlement offer or initiating prior injury investigation.

Clause 2. The method of clause 1, further comprising prompting the claimant to upload accident reports, medical documentation, and photographic evidence, wherein said photographic evidence is analyzed using depth or heat mapping sensors to extract injury data.

Clause 3. The method of clause 1, wherein the settlement valuation is transmitted exclusively to the insurance company without displaying to the claimant.

Clause 4. The method of clause 1, wherein a predetermined valuation threshold triggers automatic generation of a settlement offer within a range of about $500 to about $4,000.

Clause 5. The method of clause 1, wherein exceeding a predetermined valuation threshold triggers an internal investigation into a prior injury history of the claimant by the insurance company.

Clause 6. The method of clause 1, further comprising presenting the claimant with an option to execute a digital liability release agreement via the mobile application upon acceptance of a settlement offer.

Clause 7. The method of clause 1, wherein the insurance company server identifies claimant policy details based on an uploaded accident report and pre-existing customer databases.

Clause 8. The method of clause 2, wherein injury severity extracted from sensor data is used to modify the settlement valuation.

Clause 9. The method of clause 1, further comprising presenting selectable options to the claimant to identify a liable insurance company from a database.

Clause 10. The method of clause 1, wherein the settlement valuation includes factors selected from the group consisting of: accident severity, medical treatment received, injury photographs, and historical accident data.

Clause 11. A system for facilitating direct settlement negotiations between injury claimants and insurance companies, comprising: an electronic device comprising: a user interface configured to receive claimant inputs, accident data, and supporting documentation; and a LiDAR-based injury mapping assembly configured to generate a three-dimensional spatial representation of one or more physical injuries, the injury mapping assembly comprising: a mechanical support structure configured to retain an array of light-emitting components and corresponding photodetector elements arranged in spatial alignment; a rotational actuation mechanism operatively coupled to the support structure and configured to rotate the array of light-emitting components and photodetector elements about a rotational axis at a speed ranging from about 100 revolutions per minute (RPM) to about 350 RPM; the light-emitting components configured to emit pulsed light signals during rotation to illuminate a target region of a body of a claimant, and the photodetector elements configured to receive reflected light signals and generate corresponding depth data; a motion correction and scan verification subsystem configured to detect motion-related anomalies, correct spatial distortion in real time, and initiate reacquisition of data if scan completeness or integrity falls below a predefined threshold; a server communicatively coupled to the electronic device and configured to receive the claimant inputs and the spatial injury representation; an artificial intelligence module operatively associated with the server and configured to generate a settlement valuation based at least in part on the claimant inputs and the spatial injury representation; and a workflow engine configured to trigger a settlement offer generation or initiate a prior injury investigation based on the settlement valuation.

Clause 12. The system of clause 11, wherein the electronic device includes one or more sensors configured to capture injury evidence, wherein said evidence is transmitted to the server for analysis.

Clause 13. The system of clause 11, wherein the server identifies the insurance company from a claimant-provided selection within a mobile application.

Clause 14. The system of clause 11, wherein the workflow engine transmits a settlement offer to the claimant via a mobile application and facilitates digital signature of a release agreement.

Clause 15. The system of clause 11, wherein the server maintains a secure database of participating insurance companies and corresponding data endpoints.

Clause 16. A non-transitory computer-readable medium storing instructions that, when executed by one or more processors in a mobile computing system with a LiDAR-based injury documentation subsystem and an artificial intelligence module, cause the computing system to perform operations comprising: verifying, via a graphical user interface of a mobile device, that a claimant is not represented by legal counsel; receiving, from the mobile device, claimant data including structured accident metadata, medical documentation, and injury images; activating a LiDAR-based sensing unit integrated within the mobile device to perform injury surface scanning by: emitting a modulated light pulse from a light-emitting component; receiving a reflected signal via a time-gated photodetector array; generating a digital return waveform comprising a sequence of signal amplitudes; detecting a local peak amplitude within the waveform and selecting a window of neighboring samples; applying a localized curve-fitting algorithm to the selected window to determine a sub-sample timestamp associated with a center of the return pulse; calculating a round-trip time of flight based on the sub-sample timestamp and a known speed of light; and determining a distance to the scanned surface based on the time of flight and using that distance to generate a three-dimensional injury profile; transmitting the claimant data and the three-dimensional injury profile over an encrypted network connection to a remote insurance company server; processing the received data with an artificial intelligence module configured to apply trained machine learning models to generate a settlement valuation based on the injury profile, accident metadata, and historical case data; and triggering a settlement workflow comprising either: (a) generation and transmission of a digital settlement offer accompanied by a release agreement, or (b) initiation of a prior injury verification procedure, based on threshold conditions applied to an AI-generated valuation.

Clause 17. The non-transitory computer-readable medium of clause 16, further comprising instructions to analyze photographic evidence using depth mapping and thermal imaging algorithms.

Clause 18. The non-transitory computer-readable medium of clause 16, wherein the settlement valuation is adjusted based on severity scores derived from uploaded evidence based on the received claimant data.

Clause 19. The non-transitory computer-readable medium of clause 16, wherein a settlement offer is automatically generated if the valuation falls within a predetermined monetary range.

Clause 20. The non-transitory computer-readable medium of clause 16, wherein the instructions further enable execution of a digital liability release agreement through a mobile application.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method for facilitating direct settlement negotiations between a claimant and an insurance company, comprising:

executing, on a claimant computing device comprising at least one processor, memory, and a display, a mobile application configured to receive input from the claimant;

receiving, via the mobile application, claimant information and accident data;

verifying, via the mobile application, that the claimant is not represented by legal counsel;

transmitting the claimant information and accident data from the claimant computing device to an insurance company server via a secure network connection;

generating, via an artificial intelligence module executed by the insurance company server, a settlement valuation based on the received claimant information and accident data;

triggering, based on the settlement valuation, one or more settlement workflows including issuing a settlement offer or initiating a prior injury investigation;

receiving, via a thermography sensor operatively coupled to the claimant computing device, thermographic image data indicative of temperature variations in a region of a body of a clamant;

processing, via an onboard image analysis module, the thermographic image data to identify hot and cold zones indicative of inflammation or injury severity;

integrating, via the artificial intelligence module, the processed thermographic injury data into a settlement valuation calculation;

generating, via the claimant computing device, a chatbot interface comprising a natural language input section and a chatbot response section, the chatbot interface configured to simulate human conversation with the claimant;

generating, via the chatbot interface, a structured result table based on claimant data, accident attributes, injury severity, and settlement workflow status;

displaying, via the chatbot response section on the claimant computing device display, the result table in response to a natural language query entered in the chatbot input section; and executing, via the mobile application, a digital signature interface that enables the claimant to accept a settlement offer and execute a liability release agreement electronically;

wherein processing the thermographic image data comprises:

converting, via the image analysis module, pixel intensity values of the thermographic image to corresponding temperature values using calibration data;

segmenting the thermographic image into predefined anatomical regions using computer vision algorithms;

computing a temperature gradient matrix across the segmented anatomical regions; and classifying at least one anatomical region as inflamed based on a comparison of the computed temperature values or gradients to a threshold or a machine learning model trained on historical injury data.

2. The method of claim 1, wherein the thermography sensor is configured to capture both still images and real-time video of temperature distributions over the body of the claimant.

3. The method of claim 1, wherein the image analysis module classifies inflammation zones using a predefined color temperature scale and maps them to anatomical regions.

4. The method of claim 1, wherein the chatbot interface provides contextual follow-up prompts based on the claimant's prior queries and displayed result table content.

5. The method of claim 1, wherein the result table includes selectable entries that reveal expanded content including uploaded medical documentation and accident photos.

6. The method of claim 1, wherein the secure network connection employs end-to-end encryption compliant with health insurance portability and accountability act (HIPAA) or equivalent data privacy standards.

7. The method of claim 1, further comprising storing the result table and thermographic data in a secure, access-controlled database associated with a claimant record.

8. The method of claim 1, wherein the artificial intelligence module uses machine learning trained on prior injury cases to adjust the settlement valuation based on thermographic injury data patterns.

9. A system for facilitating direct settlement negotiations between a claimant and an insurance company, the system comprising:

a claimant computing device comprising at least one processor, a memory, a display, and a thermography sensor;

a mobile application stored in the memory and executable by the processor of the claimant computing device, the mobile application configured to:

receive claimant information and accident data;

verify, based on received input, that the claimant is not represented by legal counsel;

transmit the claimant information and accident data to an insurance company server over a secure network connection;

provide a chatbot interface, the chatbot interface comprising a natural language input section and a chatbot response section;

generate a structured result table comprising at least claimant data, accident attributes, injury severity, and settlement workflow status;

display the structured result table via the chatbot response section in response to a natural language query entered via the natural language input section;

receive thermographic image data captured by the thermography sensor; and provide a digital signature interface configured to allow the claimant to electronically execute a liability release agreement upon acceptance of a settlement offer;

an image analysis module stored in the memory and executable by the processor of the claimant computing device, the image analysis module configured to:

convert pixel intensity values of the thermographic image data into corresponding temperature values using calibration data;

segment the thermographic image data into predefined anatomical regions using computer vision algorithms;

compute a temperature gradient matrix across the segmented anatomical regions; and classify at least one anatomical region as inflamed based on a comparison of the temperature values or gradients to at least one of a threshold value or a machine learning model trained on historical injury data; and an artificial intelligence module hosted on the insurance company server, the artificial intelligence module configured to: generate a settlement valuation based on the claimant information, the accident data, and the classified thermographic injury data; and trigger, based on the settlement valuation, one or more settlement workflows including issuance of a settlement offer or initiation of a prior injury investigation.

* * * * *